United States Patent
Oyama et al.

(10) Patent No.: US 7,106,718 B2
(45) Date of Patent: Sep. 12, 2006

(54) SIGNALING QUALITY OF SERVICE CLASS FOR USE IN MULTIMEDIA COMMUNICATATIONS

(75) Inventors: Johnson Oyama, Solna (SE); Ina B. Widegren, Stockholm (SE); Brian C. Williams, Victoria (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 949 days.

(21) Appl. No.: 10/068,002

(22) Filed: Feb. 8, 2002

(65) Prior Publication Data

US 2002/0114305 A1 Aug. 22, 2002

Related U.S. Application Data

(60) Provisional application No. 60/267,737, filed on Feb. 9, 2001, provisional application No. 60/269,572, filed on Feb. 16, 2001, provisional application No. 60/269,573, filed on Feb. 16, 2001, provisional application No. 60/269,789, filed on Feb. 16, 2001, provisional application No. 60/273,678, filed on Mar. 6, 2001, provisional application No. 60/275,354, filed on Mar. 13, 2001, provisional application No. 60/324,523, filed on Sep. 26, 2001.

(51) Int. Cl.
  *H04L 12/64* (2006.01)
(52) U.S. Cl. ...................... 370/340; 370/352
(58) Field of Classification Search ................ 370/252, 370/340, 352
  See application file for complete search history.

(56) References Cited

U.S. PATENT DOCUMENTS

2002/0093979 A1* 7/2002 Chen et al. ................. 370/466
2002/0122429 A1* 9/2002 Griggs ....................... 370/401
2002/0191556 A1* 12/2002 Krishnarajah et al. ...... 370/329

OTHER PUBLICATIONS www.3gpp.org/ftp/tsg_sa/WG2_Arch/TSGS2_13/tdocs/S2-000937, 3GPP TSG SA WG2 #13, Berlin, Germany, Jun. 22-26, 2000, "Quality of Service for IP-based Signalling Traffic".
www.3gpp.org/ftp/tsg_sa/WG2_Arch/TSGS2_13/tdocs/S2q-000003, 3GPP TSG SA WG2, Sophia Antipolis, France, Oct. 9-12, 2000, "Activating a signalling PDP context".
www.3gpp.org/ftp/tsg_sa/WG2_Arch/TSGS2_16/tdocs/QoS_stuff/set_ql/S2-010009, 3GPP TSG SA WG2 #16, Los Angeles, Jan. 22-26, 2001, "UMTS bearer appropriate for signalling".

(Continued)

*Primary Examiner*—Melvin Marcelo
(74) *Attorney, Agent, or Firm*—Nixon & Vanderhye P.C.

(57) ABSTRACT

A signaling bearer quality of service profile is pre-established and configured in various nodes in an access network. This is a new quality of service class designed to meet the needs of signaling bearers in multimedia sessions. A message requesting a bearer to support a communication between a mobile terminal and an access point to a packet data network is generated. That message includes a signaling quality of service indicator, which when detected, causes a bearer to be established between the mobile terminal and the access point in accordance with the pre-established signaling quality of service profile. The pre-established signaling quality of service profile typically includes low delay and low bit error rates in addition to high priority and accommodation of bursty traffic patterns. A signaling usage indicator may also employed to implement a standard set of minimum signaling bearer capabilities.

77 Claims, 16 Drawing Sheets

OTHER PUBLICATIONS www.3gpp.org/ftp/tsg_sa/WG2_Arch/TSGS2_16/tdocs/S2-010185, 3GPP TSG SA WG2, Los Angeles, USA, Jan. 22-26, 2001, "Activating a PDP context for signalling".

Marshall et al., "Integration of Resource Management and SIP for IP Telephony," SIP Working Group, Internet Draft, Mar. 2000. www.ietf.org/internet-drafts/draft-manyfolks-sip-resource-00.txt.

Marshall et al., "Integration of Resource Management and SIP," SIP Working Group, Internet Draft, Jun. 2000. www.ietf.org/internet-drafts/draft-manyfolks-sip-resource-01.txt.

Marshall et al., "Integration of Resource Management and SIP," SIP Working Group, Internet Draft, Nov. 2000. www.ietf.org/internet-drafts/draft-ietf-sip-manyfolks-resource-00.

Marshall et al., "Integration of Resource Management and SIP," SIP Working Group, Internet Draft, Feb. 2001. www.ietf.org/internet-drafts/draft-ietf-sip-manyfolks-resource-01.

Marshall et al., "SIP Extensions for Media Authorization," SIP Working Group, Internet Draft, Mar. 2000. www.ietf.org/internet-drafts/draft-dcsgroup-sip-call-auth-01.txt.

Marshall et al., "SIP Extensions for Media Authorization," SIP Working Group, Internet Draft, Nov. 2000. www.ietf.org/internet-drafts/draft-ietf-sip-call-auth-00.txt.

Marshall et al., "SIP Extensions for Media Authorization," SIP Working Group, Internet Draft, Feb. 2001. www.ietf.org/internet-drafts/draft-ietf-sip-call-auth-01.txt.

* cited by examiner

| TRAFFIC CLASS | CONVERSATIONAL CLASS CONVERSATIONAL RT | STREAMING CLASS STREAMING RT | INTERACTIVE CLASS INTERACTIVE BEST EFFORT | BACKGROUND BACKGROUND BEST EFFORT |
|---|---|---|---|---|
| FUNDAMENTAL CHARACTERISTICS | • PRESERVE TIME RELATION (VARIATION) BETWEEN INFORMATION ENTITIES OF THE STREAM<br>• CONVERSATIONAL PATTERN (STRINGENT AND LOW DELAY) | • PRESERVE TIME RELATION (VARIATION) BETWEEN INFORMATION ENTITIES OF THE STREAM | • REQUEST RESPONSE PATTERN<br>• PRESERVE PAYLOAD CONTENT | • DESTINATION IS NOT EXPECTING THE DATA WITHIN A CERTAIN TIME<br>• PRESERVE PAYLOAD CONTENT |
| EXAMPLE OF THE APPLICATION | – VOICE | – STREAMING VIDEO | – WEB BROWSING | – BACKGROUND DOWNLOAD OF EMAILS |

Fig. 7

| TRAFFIC CLASS | CONVERSATIONAL | STREAMING | INTERACTIVE | BACKGROUND |
|---|---|---|---|---|
| MAXIMUM BIT RATE | x | x | x | x |
| GUARANTEED BIT RATE | x | x | | |
| DELIVERY ORDER | x | x | x | x |
| MAXIMUM SDU SIZE | x | x | x | x |
| SDU FORMAT INFO *) | x | x | | |
| SDU LOSS RATIO | x | x | x | x |
| RESIDUAL BIT ERROR RATIO | x | x | x | x |
| DELIVERY OF ERRONEOUS SDUS | x | x | x | x |
| TRANSFER DELAY | x | x | | |
| TRAFFIC HANDLING PRIO | | | x | |
| ALLOCATION/RETENTION PRIORITY | x | x | x | x |
| SOURCE STATISTICS DESCRIPTOR *) | x | x | | |

*) PARAMETER DIFFERS DEPENDING ON IF IT IS A UMTS BS DESCRIPTION OR A RAB SERVICE DESCRIPTION

Fig. 8

| | |
|---|---|
| TRAFFIC CLASS | THE TRAFFIC CLASS LABEL CONTAINS A LOT OF INFORMATION ITSELF |
| MAXIMUM BIT RATE | USED FOR DOWNLINK CODE RESERVATION, POLICING AND SHAPING TOWARDS EXTERNAL NETWORKS |
| GUARANTEED BIT RATE | USED FOR ADMISSION CONTROL AND RESOURCE RESERVATION |
| DELIVERY ORDER | USED TO SETTLE WHETHER PDUs HAVE TO BE BUFFERED AND REORDERED IN ORDER TO BE IN SEQUENCE AT THE OUTPUT OF THE SYSTEM |
| MAXIMUM SDU SIZE | USED FOR ADMISSION CONTROL AND POLICING |
| SDU FORMAT INFO *) | RLC CONFIGURATION. IF INFORMATION OF ALL POSSIBLE SDU SIZES IS GIVEN, THEN RLC CAN BE TRANSPARENT (IN CASE NO ARQ IS NEEDED). |
| SDU LOSS RATIO | USED FOR ARQ CONFIGURATION, ERROR DETECTION CONFIGURATION ON L1 (CRC) |
| RESIDUAL BIT ERROR RATIO | CHOICE OF CHANNEL CODING, ERROR DETECTION ON L1 |
| DELIVERY OF ERRONEOUS SDUs | IS THE NW ALLOWED TO DISCARD PACKETS IN CASE OF ERRONEOUS CHECKSUM? |
| TRANSFER DELAY | THE DELAY IS USED TO DETERMINE WHETHER ARQ SHALL/CAN BE USED OR NOT. ALSO USED FOR TRANSPORT FORMAT SETTINGS. |
| TRAFFIC HANDLING PRIORITY | FOR DIFFERENTIATE INTERACTIVE SERVICE CLASS FOR SCHEDULING PURPOSES |
| ALLOCATION/RETENTION PRIORITY | USED FOR ADMISSION CONTROL AND SETTLEMENT IN CASE OF CONGESTION, I.E. WHO TO ADMIT AND WHO TO DISCARD. |
| SOURCE STATISTICS DESCRIPTOR *) | THIS INFORMATION THAT GIVES THE POSSIBILITY TO USE STATISTICS AT ADMISSION CONTROL, E.G. SPEECH AND DTX. |

*) PARAMETER DIFFERS DEPENDING ON IF IT IS A UMTS BS DESCRIPTION OR A RAB SERVICE DESCRIPTION

Fig. 9

| 8 | 7 | 6 | 5 | 4 | 3 | 2 | 1 | |
|---|---|---|---|---|---|---|---|---|
| \multicolumn{8}{|c|}{Quality of service IEI} | Octet 1 |
| \multicolumn{8}{|c|}{Length of quality of service IE} | Octet 2 |
| Signaling QoS Indicator | 0 spare | \multicolumn{3}{c|}{Delay class} | \multicolumn{3}{c|}{Reliability class} | Octet 3 |
| \multicolumn{3}{|c|}{Peak throughput} | \multicolumn{2}{c|}{0 spare} | \multicolumn{3}{c|}{Precedence class} | Octet 4 |
| 0 | 0 spare | 0 | \multicolumn{5}{c|}{Mean throughput} | Octet 5 |
| \multicolumn{3}{|c|}{Traffic class} | \multicolumn{2}{c|}{Delivery order} | \multicolumn{3}{c|}{Delivery of erroneous SDU} | Octet 6 |
| \multicolumn{8}{|c|}{Maximum SDU size} | Octet 7 |
| \multicolumn{8}{|c|}{Maximum bit rate for uplink} | Octet 8 |
| \multicolumn{8}{|c|}{Maximum bit rate for downlink} | Octet 9 |
| \multicolumn{4}{|c|}{Residual BER} | \multicolumn{4}{c|}{SDU error ratio} | Octet 10 |
| \multicolumn{5}{|c|}{Transfer delay} | \multicolumn{3}{c|}{Traffic handling priority} | Octet 11 |
| \multicolumn{8}{|c|}{Guaranteed bit rate for uplink} | Octet 12 |
| \multicolumn{8}{|c|}{Guaranteed bit rate for uplink} | Octet 13 |
| \multicolumn{8}{|c|}{Signaling QoS Indicator} | Octet 14 |

*QoS Information Included in PDP Context Setup Message*

*Fig. 16*

| 8 | 7 | 6 | 5 | 4 | 3 | 2 | 1 | |
|---|---|---|---|---|---|---|---|---|
| \multicolumn{8}{|c|}{Protocol configuration options IEI} | Octet 1 |
| \multicolumn{8}{|c|}{Length of protocol config. options contents} | Octet 2 |
| 1 ext | 0 | 0 spare | 0 | Signaling Usage Indicator | \multicolumn{3}{|c|}{Configuration protocol} | Octet 3 |
| \multicolumn{8}{|c|}{Protocol ID 1} | Octet 4 Octet 5 |
| \multicolumn{8}{|c|}{Length of protocol ID 1 contents} | Octet 6 |
| \multicolumn{8}{|c|}{Protocol ID 1 contents} | Octet 7 Octet m |
| \multicolumn{8}{|c|}{Protocol ID 2} | Octet m+1 Octet m+2 |
| \multicolumn{8}{|c|}{Length of protocol ID 2 contents} | Octet m+3 |
| \multicolumn{8}{|c|}{Protocol ID 2 contents} | Octet m+4 Octet n |
| \multicolumn{8}{|c|}{. . .} | Octet n+1 Octet x |
| \multicolumn{8}{|c|}{Protocol ID n-1} | Octet x+1 Octet x+2 |
| \multicolumn{8}{|c|}{Length of protocol ID n-1 contents} | Octet x+3 |
| \multicolumn{8}{|c|}{Protocol ID n-1 contents} | Octet x+4 Octet y |
| \multicolumn{8}{|c|}{Protocol ID n} | Octet y+1 Octet y+2 |
| \multicolumn{8}{|c|}{Length of protocol ID n contents} | Octet y+3 |
| \multicolumn{8}{|c|}{Protocol ID n contents} | Octet y+4 Octet z |

*Protocol Configuration Options Information Element*

*Fig. 17*

SIGNALING QUALITY OF SERVICE CLASS FOR USE IN MULTIMEDIA COMMUNICATATIONS

REFERENCE TO PRIORITY APPLICATIONS

This application claims priority from and incorporates by reference the following commonly-assigned provisional patent applications: 60/267,737 entitled "Authorization Token in PDP context Activation/Modification in Bearer Establishment for SIP Call Setup, " filed Feb. 9, 2001; 60/269,572 entitled "Binding a Signaling Bearer for Use With an IP Multimedia Subsystem, " filed Feb. 16, 2001; 60/269,573 entitled "QoS Characteristics for a UMTS Bearer Appropriate for IP Signaling," filed Feb. 16, 2001; 60/269,789 entitled "Architecture for Packet Data Protocol Context Suitable for Signaling," filed Feb. 16, 2001; 60/273,678 entitled "SDP Support for QoS Based SIP Sessions," filed Mar. 6, 2001; 60/275,354 entitled "Enhancement of Authorization Token for RSVP Interworking," filed Mar. 13, 2001; and 60/324,523, entitled "Use of GPRS APN in IMS/Ipv6 Context," filed on Sep. 26, 2001.

CROSS-REFERENCE TO RELATED APPLICATIONS

This application is related to commonly-assigned U.S. patent application Ser. No. 09/768,956, entitled "RSBP Handling in 3G Networks, " filed on Jan. 24, 2001; U.S. patent application Ser. No. 09/861,817, entitled "Application Influenced Policy," filed on May 21, 2001; U.S. patent application Ser. No. 09/985,573, entitled "Media Binding to Coordinating Quality of Service Requirements for Media Flows in a Multimedia Session with IP Bearer Resources," filed Nov. 5, 2001; and U.S. patent application Ser. No. 09/985,633, entitled "Method and Apparatus for Coordinating Charges for Services Provided in a Multimedia Session," filed Nov. 5, 2001; and U.S. patent application Ser. No. 09/985,631, entitled "Method and Apparatus for Coordinating Quality of Service Requirements for Media Flows in a Multimedia system With IP Bearer Resources," filed Nov. 5, 2001; and U.S. patent application Ser. No. 10/038,770, entitled "Method and Apparatus for Coordinating End-to-End Quality of Service Requirements for Media Flows in a Multimedia Session," filed Jan. 8, 2002, the disclosures of which are incorporated herein by reference.

FIELD OF THE INVENTION

The present invention generally relates to Internet Protocol (IP) networks, and more specifically, to establishing Quality of Service (QoS) for a signaling bearer used to establish a multimedia session across an IP access network.

BACKGROUND

IP networks were originally designed to carry "best effort" traffic where the network makes a "best attempt" to deliver a user packet, but does not guarantee that a user packet will arrive at the destination. Because of the market success of IP networks, there is a clear requirement for mechanisms that allow IP networks to support various types of applications. Some of these applications have Quality of Service (QoS) requirements other than "best effort" service. Examples of such applications include various real time applications (IP Telephony, video conferencing), streaming services (audio or video), or high quality data services (browsing with bounded download delays). Recognizing these QoS requirements, the Internet Engineering Task Force (IETF), which is the main standards body for IP networking, standardized a set of protocols and mechanisms that enable IP network operators to build QoS-enabled IP networks.

FIG. 1 depicts a simplified high-level model of an IP network accessed by end users via associated access networks which may be useful in explaining QoS provisioning. As can be appreciated, the model includes two users, but could easily be expanded to include more users without changing the basic functionality of the network. In FIG. 1, User-A 10 may communicate with User-B 12 or with an application server 13. For example, in the case of an IP telephony session, User-A 11 may communicate with User-B 12. Similarly, in the case of streaming services, User-A 11 may communicate with the application server 13, which may be configured as a video server. In either case, User-A 11 accesses an IP backbone network 14 through a local access network 15, such as PSTN (dial-in access), Global System for Mobile Communications (GSM), or Universal Mobile Telecommunications System (UMTS) network. User-B 12 is similarly connected to the IP network 14 through a local access network 16. Of particular interest to this invention is the specific case where at least one of the access networks is a UMTS or GSM/GPRS network. However, User-A and User-B need not use the same type of access network. The IP network 104 may consist of a number of IP routers and interconnecting links that together provide connectivity between the IP network's ingress and egress points and thereby make two party communication possible. As far as the users are concerned, the QoS depends on both of the access networks 15, 16 and on the IP backbone network 14.

QoS is particularly important for multimedia type communications between a mobile host and a remote host in which a "session" established between the mobile and remote hosts includes two or more different forms of media that often require different types of QoS, e.g., voice, e-mail, video, etc. Consider the example, simplified data communications system shown in FIG. 2 which permits a Mobile Terminal (MT) 20 to initiate and conduct a multimedia session with a remote host 30. The remote host 30 can be a fixed or wireless device. The mobile terminal 20 is coupled to a radio access network (RAN) 22 over the radio interface. The RAN 22 is coupled to an Access Point in packet-switched access network (PSAN) 24, which in turn is coupled to a Packet Data Network (PDN) 28, e.g., the Internet, to which the remote host 30 is coupled. The basic traffic flow for a multimedia session (shown as solid lines) between the mobile terminal 20 and remote host 30) is transported via these three networks 22, 24, and 28. The PSAN 24 and the PDN 28 communicate multimedia control signaling (shown as dashed lines) to a Multimedia System 26 that can be separate from or an integral part of the Packet Data Network 28.

Various user applications may access network services through an application programming interface (API). An API provides application programmers with a uniform interface to access underlying system resources. For instance, an API may be used to configure a network resource manager to require that a particular IP packet originating from a given application receive a certain treatment from the network, such as a particular QoS. For example, if the IP network is a Differentiated Services IP network, then an application program may request that all of its IP packets receive the "Expedited Forwarding" treatment.

The User (and the API in the user's equipment) may not be aware of the different technologies that various access networks and IP backbone networks employ in order to provide QoS end-to-end, i.e., from User-A all the way to remote User-B. For instance, the application program may use an RSVP/IntServ based API, and the end-to-end embodiment in which he is involved may include a UMTS access network and a non-RSVP enabled IP network. In such cases, some "interworking" mechanisms between such different technologies and protocols are needed to make sure that the QoS is provided end-to-end.

Integrated Services (IntServ) provides a set of well-defined services which enables an application to choose among multiple, controlled levels of delivery service for their data packets. To support this capability, two things are required. First, individual network elements, such as subnets and IP routers, along the path followed by an application's data packets must support mechanisms to control the quality of service delivered to those packets. Second, a way to communicate the application's requirements to network elements along the path and to convey QoS management information between network elements and the application must be provided.

IntServ defines a number of services such as Controlled-Load (defined in IETF RFC 2211) and Guaranteed (defined in IETF RFC 2212). The service definition defines the required characteristics of the network equipment in order to deliver the service. The individual network elements (subnets and IP routers) that support the service must comply with the definitions defined for the service.

The service definition also defines the information that must be provided across the network in order to establish the service. This function may be provided in a number of ways, but it is frequently implemented by the resource reservation setup protocol RSVP (defined in IETF RFC 2205). RSVP (Resource reSerVation Protocol) is an IP-level resource reservation setup protocol designed for an IntServ-enabled Internet (defined in IETF RFC 1633, 2205, and 2210). The RSVP protocol is used by a host (e.g., User A's computer) to request specific service from the network for particular application data streams or flows. RSVP is also used by routers to deliver quality-of-service requests to all nodes along the path(s) of the flows and to establish and maintain the state(s) to provide the requested service. RSVP requests generally result in resources being reserved in each node along the data path.

In a Differentiated Services network, an "edge router" is at the network boundary, and a "core router" is within the network. The edge and core routers have different duties. The edge router must "condition" the traffic to ensure that it conforms to a service agreement, and marks traffic with the appropriate DSCP (Differentiated Services Code Point). It then forwards each packet according to the service behavior defined for that DSCP. The service behavior, called the Per Hop Behavior (PHB) may define the prioritization or weighting of that traffic to give it better service than other traffic. The core nodes examine the DSCP and apply per hop service behavior appropriate for that service.

To realize a QoS Service with clearly defined characteristics and functionality, a QoS bearer must be set up from the source to the destination of the service. A bearer is a logical connection between two entities through one or more interfaces, networks, gateways, etc., and usually corresponds to a data stream or data flow. A QoS bearer service includes all aspects to enable the provision of a contracted QoS. These aspects include control signaling, user plane transport, and QoS management functionality.

Mobile Radio Access Data Networks, like General Packet Radio Service (GPRS) and Universal Mobile Telecommunication System (UMTS), may form a part of the overall network and will typically be a significant factor in the end-to-end bearer service for customers connected to it. Hence, the bearer service over a GPRS/UMTS network is important to achieving the required end-to-end bearer service.

The GPRS/UMTS network includes a set of network elements between the host, referred to as the Mobile Station (MS), and an external packet switching network the user is connecting to like the Internet. These network elements are shown in FIG. 3. The radio access network (RAN) provides access over the radio interface to/from the mobile station (MS) host. The RAN is coupled to a Serving GPRS Support Node (SGSN) and a Gateway GPRS Support Node (GGSN). The GGSN provides the interworking with external packet-switched networks, e.g., the Internet.

Before a mobile host can send packet data to a remote host, the mobile host must "attach" to the GPRS network to make its presence known and to create a packet data protocol (PDP) context. The PDP context establishes a relationship with a GGSN towards the external network that the mobile host is accessing. The PDP attach procedure is carried out between the mobile host and the SGSN to establish a logical link. As a result, a temporary logical link identity is assigned to the mobile host. A PDP context is established between the mobile host and a GGSN selected based on the name of the external network to be reached. One or more application flows (sometimes called "routing contexts") may be established over a single PDP context through negotiations with the GGSN. An application flow corresponds to a stream of data packets distinguishable as being associated with a particular host application. An example application flow is an electronic mail message from the mobile host to a fixed terminal. Another example application flow is a link to a particular Internet Service Provider (ISP) to download a graphics file from a website. Both of these application flows are associated with the same mobile host and the same PDP context. User data is transferred transparently between the MS and the external data networks with a method known as encapsulation and tunneling: data packets are equipped with PS-specific protocol information and transferred between the MS and the GGSN.

Quality of Service (QoS) has an extremely important and central role in $3^{rd}$ generation (3G) UMTS mobile networks, especially for multimedia sessions. QoS is a means for providing end users with satisfying service. QoS also enables efficient use of the spectrum resources. Because the invention will be described in terms of a UMTS QoS architecture, a brief overview of QoS in UMTS is provided. The 3G UMTS QoS architecture is described, including an explanation of the packet data protocol context (PDP context), a traffic flow template (TFT), and the QoS maintenance procedures for activated UMTS bearers. It is expected that the QoS characteristics associated with a radio communication are the most critical in the end-to-end chain. Within UMTS access networks, the radio network resources are managed on a per PDP context level, which corresponds to one or more user flow/data streams and a certain QoS level.

The QoS framework for 3G networks is specified in the 3G specification (3GPP) TS23.107. The main focus is on the QoS architecture to be used in the UMTS level, where the list of QoS attributes applicable to UMTS Bearer Service and the Radio Access Bearer Service are specified along with appropriate mapping rules. TS23.060 specifies the general mechanisms used by data packet connectivity services in the UMTS level, which includes the General Packet Radio Service (GPRS) in GSM and UMTS.

In a UMTS QoS Architecture, a network service is considered to be end-to-end, from a Terminal Equipment (TE) to another TE. To realize a certain end-to-end QoS, a bearer service with clearly defined characteristics and functionality is set up from the source to the destination of a service. Again, the bearer service includes those aspects needed to enable the provision of a contracted QoS, e.g., control signaling, user plane transport, QoS management and functionality.

A UMTS bearer service layered architecture is depicted in FIG. 5. Each bearer service on a specific layer offers its individual services using services provided by the layers below. Bearers at one layer are broken down into underlying bearers, each one providing a QoS realized independently of the other bearers. Service agreements are made between network components, which are arranged horizontally in FIG. 4. The service agreements may be executed by one or more service layers. For instance, the UMTS bearer service consists of a Radio Access Bearer (RAB) service and a Core Network (CN) bearer service. The RAB service is then divided into a radio bearer service and a Iu bearer service. The Iu interface is the interface between the radio access network and the core network.

The following are examples of the entities shown in FIG. 4. The terminal equipment (TE) may be a laptop and the mobile terminal (MT) may be a cellular radio handset. The UTRAN may be made up of a combination of radio base stations called Node B's and radio network controllers (RNCs). The Core Network (CN) Iu Edge Node may be a serving GPRS support node (SGSN), and the CN Gateway may be a gateway GPRS support node (GGSN).

The QoS management functions in UMTS are used to establish, modify, and maintain a UMTS Bearer Service with a specific QoS, as defined by specific QoS attributes. The QoS management functions of all the UMTS entities ensure provision of the negotiated UMTS bearer service. The UMTS architecture comprises four management functions in the control plane and four in the user plane. The four control plane management functions are shown in FIG. 5:

Bearer Service (BS) Manager sets up, controls, and terminates the corresponding bearer service. Each BS manager also translates the attributes of its level to attributes of the underlying bearer service during service requests.

Translation function converts between external service signaling and internal service primitives including the translation of the service attributes, and is located in the MT and in the CN Gateway.

Admission/Capability control determines whether the network entity supports the specific requested service, and whether the required resources are available.

Subscription Control determines whether the user has the subscription for the bearer being requested.

The four user plane management functions shown in FIG. 6:

Classification function resides in the GGSN and in the MT. It assigns user data units (e.g. IP packets) received from the external bearer service from the remote terminal (or the local bearer service) from the local terminal to the appropriate UMTS bearer service according to the QoS requirements of each user data unit. This is where a traffic flow template (TFT) and packet filters are situated, as described below.

Mapping function marks each data unit with the specific QoS indication related to the bearer service to which it has been classified. For example, it adds different service code points to packets before putting them on the Iu or CN bearer.

Resource Manager distributes its resources between all bearer services that are requesting use of these resources. The resource manager attempts to provide the QoS attributes required for each individual bearer service. An example of resource manager is a packet scheduler.

Traffic conditioner is a shaping and policing function which provides conformance of the user data traffic with the QoS attributes of the concerned UMTS bearer service. This resides in the GGSN and in the MT as well as in the UTRAN.

The QoS management functions of the UMTS bearer service maintain the data transfer characteristics according to the commitments established by the UMTS bearer service control functions, expressed by the bearer service attributes. The user plane uses the QoS attributes. The relevant attributes are provided to the user plane management functions by the QoS management control functions.

Four different QoS classes standardized in UMTS are shown in FIG. 7. Data transport may be optimized for the corresponding type of application data or for a bearer service of a certain class. The main distinguishing factor between these classes is how delay sensitive the traffic is: Conversational class is meant for traffic which is very delay sensitive (for real-time services) while Background class is the most delay insensitive traffic class (for non-real time services). Bit error/packet loss rate is also a significant difference between the classes.

To characterize a bearer service in detail, a set of bearer service attributes are standardized in UMTS. FIG. 8 shows which example attributes might be applicable to which example traffic class. FIG. 9 provides an overview of uses for different QoS attributes. The exact definitions of QoS attributes can be found in TS23.107. A certain QoS is requested by selecting a set of attribute values that describes the bearer requirement. Parameters differ depending on the type of bearer service requested.

A UE subscription is associated with one or more Packet Data Protocol (PDP) addresses, i.e., IP addresses in the case of IP traffic. Each PDP address is described by one or more PDP contexts stored in the MS, the SGSN, and the GGSN. Default values are also available in the cellular system database, e.g., the HLR, which holds the subscription information. Each PDP context may be associated with a Traffic Flow Template (TFT). A Traffic Flow Template is a packet filter (or set of filters) that associates packets to the correct PDP context thereby ensuring that packets are forwarded with correct QoS characteristics. The relationship between PDP address, PDP context, and TFT is shown in FIG. 10. The TFT enables the possibility of having several PDP contexts with varying QoS profiles to be associated with a single PDP address. The TFT is managed and initiated by the MT both for the uplink and downlink flows. The uplink TFT resides in the MT, while the downlink TFT resides in the GGSN. The downlink TFT is sent from the MT to the GGSN during PDP context activation/modification.

A PDP context is implemented as a dynamic table of data entries having all needed information for transferring PDP PDUs between MS and GGSN, e.g., addressing information, flow control variables, QoS profile, charging information, etc. The relation between UMTS bearer services and PDP context is a one-to-one mapping, i.e., if two UMTS bearer services are established for one PDP address, two PDP contexts are defined. The PDP context procedures are standardized in TS23.060.

Because there are several data flows corresponding to the different communications media employed in a multimedia session, each data flow is supported by a PDP context in the UMTS network which ensures a certain quality of service for the data flow. Namely, a specific transport channel transporting such a flow will have sufficient resources to support that requested quality of service. However, before these data flows and supporting PDP contexts/bearers can be established for the multimedia session, a UE must first request the multimedia session to be set up, and a number of signaling operations over a signaling bearer must be performed. In addition to session setup services, there are also ongoing session signaling needs, (e.g., for streaming services), that must be transmitted over a signaling bearer. Even though there are quality of service classes already established for radio access bearers to support different types of data flows in a multimedia session, the characteristics for a UMTS signaling/radio access bearer are not optimally satisfied by any of the already-established quality of service classes. In this regard, the characteristics of an optimal signaling UMTS/radio access bearer are as follows:

low bit error ratio
bursty traffic pattern
low delay time (to provide short session setup times)
high priority (even to the point where it may be possible to permit signaling traffic to take priority over user traffic)

None of the established quality of service classes for traffic well satisfies all of these QoS requirements for signaling. For example, a conversational class does not provide the low bit error ratio and is not appropriate for bursty traffic. A streaming class does not provide low bit error ratio and low delay, and is also not appropriate for bursty traffic. A background class, although it may meet the low bit error ratio requirement and is appropriate for bursty traffic, does not provide the low delay and high priority requirements. An interactive class provides low bit error ratio and is appropriate for bursty traffic. But to achieve low delay would require network dimensioning and scheduling on the interactive bearer in order to be achieved. Nor is the high priority requirement satisfied since the traffic handling priority parameter of the interactive class only allows priority to be defined within the interactive traffic class; it does not allow priority over other traffic classes, e.g., conversational or streaming traffic classes.

Moreover, it is also desirable for network operators to permit UMTS signaling bearers to be handled differently once established. For example, an operator may want to provide multimedia signaling bearers free of charge to encourage users to set up multimedia sessions. In this circumstance, it may be desirable to restrict the usage of a signaling UMTS bearer to only sending session initiation protocol signals to a particular destination such as a multimedia system control server. This is useful in at least two instances. First, if an operator does not charge for a signaling UMTS bearer, such restrictions do not allow a user to improperly use a "free" UMTS signaling bearer for data traffic. Second, the quality of service established for a signaling bearer, as noted above, is quite rigorous, and it may well not be the most economical use of resources for typical multimedia data flows. Alternatively, there may be situations where an operator may want to offer a signaling quality of service for use with a normal traffic bearer, perhaps with an extra surcharge.

The present invention overcomes the problems set forth above and meets the above-identified objectives. A signaling bearer quality of service profile is pre-established and configured in various nodes in an access network. This is a new quality of service (QoS) class designed to meet the needs of signaling bearers in multimedia sessions that involve a plurality of media data streams. A message requesting a bearer to support communication between a mobile terminal and an access point to a packet data network is generated. That message includes a signaling QoS indicator, which when detected, causes a bearer to be established between the mobile terminal and the access point in accordance with the pre-established signaling QoS profile. In one preferred, non-limiting, example embodiment, the bearer is a signaling bearer restricted to carrying signaling information relating to the session. In other, example, non-limiting embodiments, the signaling QoS profile may be employed in setting up media packet access bearers.

The pre-established signaling QoS profile typically includes both low delay and low bit error rate quality of service characteristics. Additional QoS characteristics might include high priority and accommodation of a bursty traffic pattern. Indeed, a high priority QoS characteristic may even permit the bearer to take priority over already established bearers. One of the benefits of the signaling QoS profile being already configured in the nodes in an access network is the quality of service for such a bearer requesting that signaling QoS profile need not be negotiated during the setup of the session, as is typically the case. Although it may be desirable for signaling bearers to have such a signaling bearer quality of service profile, if the signaling QoS indicator is not set in the bearer request message, a signaling bearer may be established with some other quality of service class/profile.

In order to control access to and use of the signaling quality of service profile, a further aspect of the present invention permits restricting use of a bearer with the pre-established signaling QoS profile. Such restriction may ensure that only signaling packets are transported over the signaling bearer, and that traffic packets are blocked from transport over the signaling bearer. This restriction may be indicated/activated using a signaling usage indicator included in the bearer request/setup message (or in some other message) that may be separate from the signaling QoS indicator. Restrictions may be implemented using packet filters at the access point node. Another example restriction is to identify a bearer source and a bearer destination of packets for the bearer established with the signaling QoS profile. Only those packets from the identified source to the identified destination are transported over the bearer. One example of source and destination includes the mobile terminal and a multimedia system server. Other restrictions and options may also be implemented/associated with the signaling usage indicator. In one non-limiting, example embodiment, the signaling usage indicator may be included in a protocol configuration options (PCO) parameter associated with the PDP context setup message.

A preferred example application is to a UMTS/GPRS access network. The UMTS/GPRS access network is coupled to an IP network such as the Internet. The session bearer request is in the form of a PDP context request message. A PDP context extends from a mobile terminal across the UMTS/GPRS access network to a GGSN node that is coupled to the Internet. The signaling QoS indicator included in such a PDP context request message may be detected in an SGSN node as well as a radio network controller (RNC). Each of RNC, SGSN, and GGSN nodes may store the pre-established signaling QoS profile before any sessions are requested. In addition, each of these nodes may be configured with a standard set of bearer capabilities associated with the signaling QoS profile.

BRIEF DESCRIPTION OF THE DRAWINGS

The foregoing and other objects, features, and advantages of the present invention may be more readily understood with reference to the following description taken in conjunction with the accompanying drawings.

FIG. 7 is a table of UMTS quality of services classes;

FIG. 8 is a table of quality of service attributes;

FIG. 9 is a table providing an overview of some uses for the QoS attributes shown in FIG. 8;

FIG. 16 is an example PDP context message with a first signaling QoS indicator; and FIG. 17 is an example PCO parameter message with a signaling usage indicator.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while one of the example embodiments is described in an example application where the local access networks are UMTS/GPRS networks, the present invention may be employed in any access network.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

In the following description, a mobile terminal is used as one example of a user equipment (UE) allowing a user access to network services. In a mobile radio communications system, the interface between the user equipment and the network is the radio interface. Thus, although the present invention is described using the term "mobile terminal," the present invention may be applied to any type or configuration of user equipment that can communicate over a radio interface.

Figure 1:
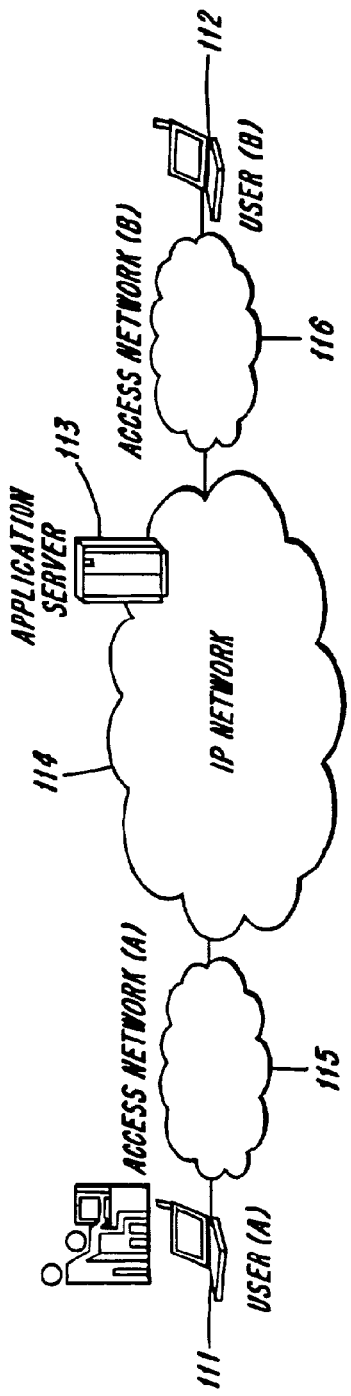
FIG. 1 is a block diagram of a high level IP network.
Figure 2:
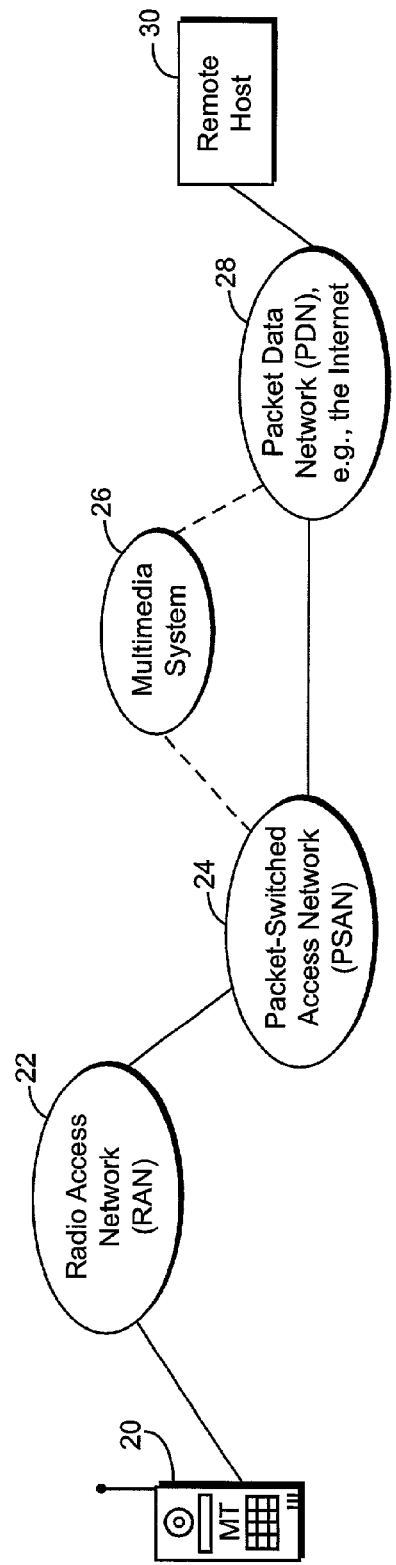
FIG. 2 is a block diagram depicting an example of a multimedia communications system in which the present invention may be employed.
Figure 3:
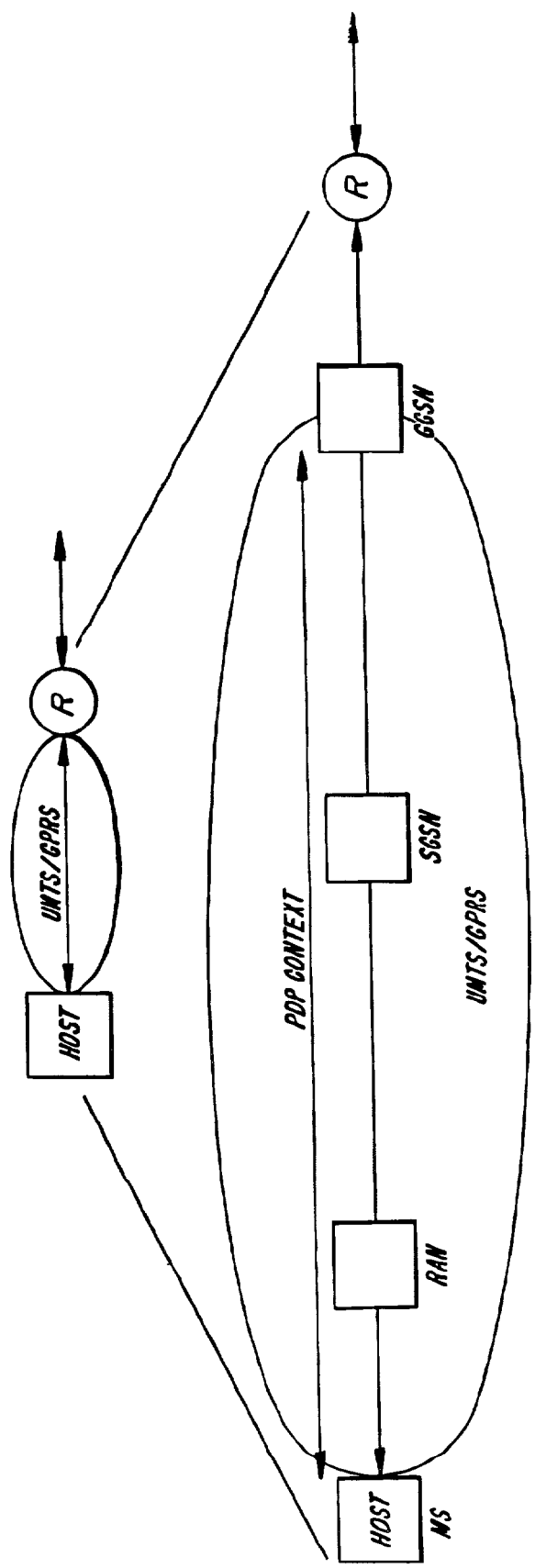
FIG. 3 is a block diagram depicting a mobile access data network modeled as a DiffServ network.
Figure 4:
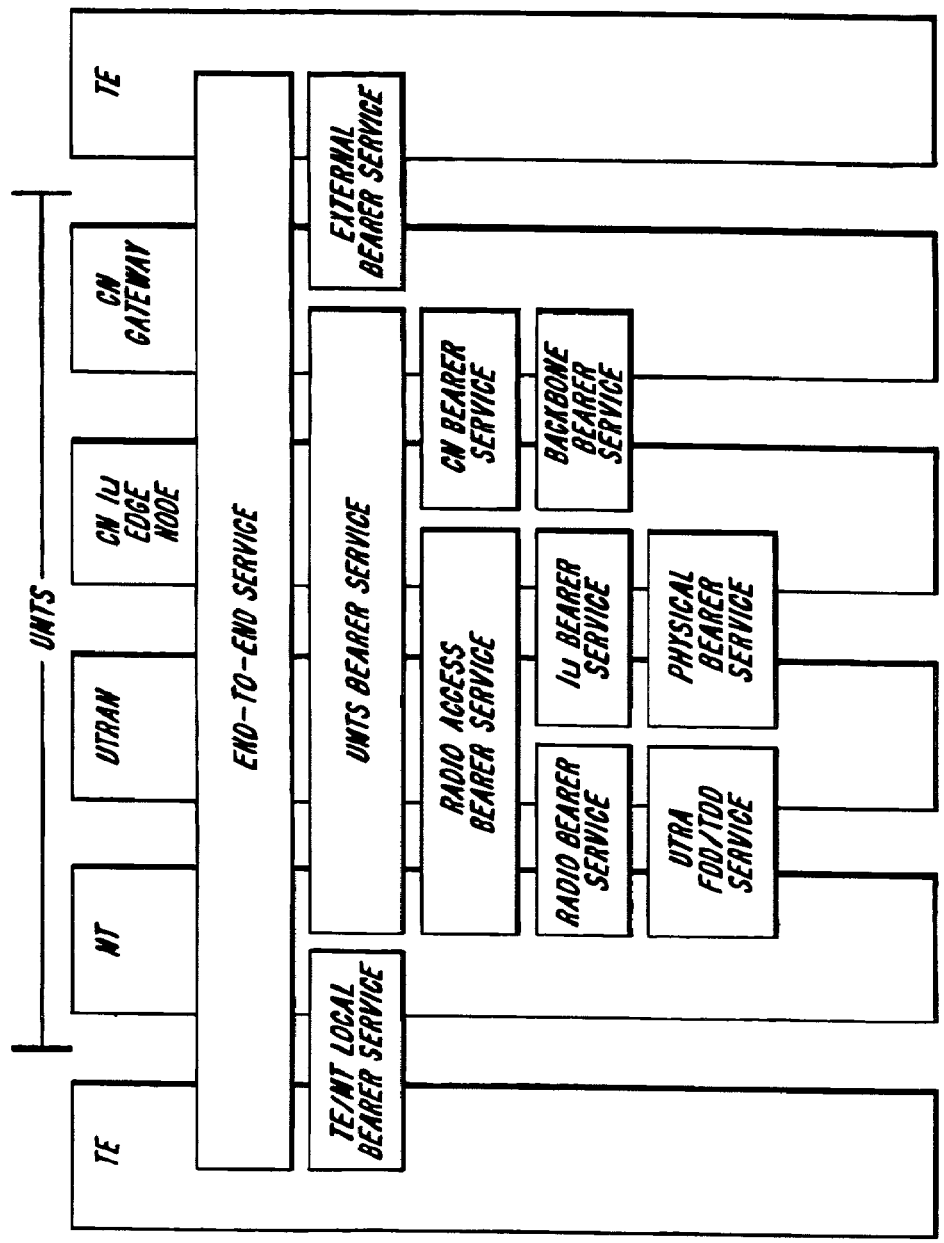
FIG. 4 is a block diagram of a UMTS quality of service architecture.
Figure 5:
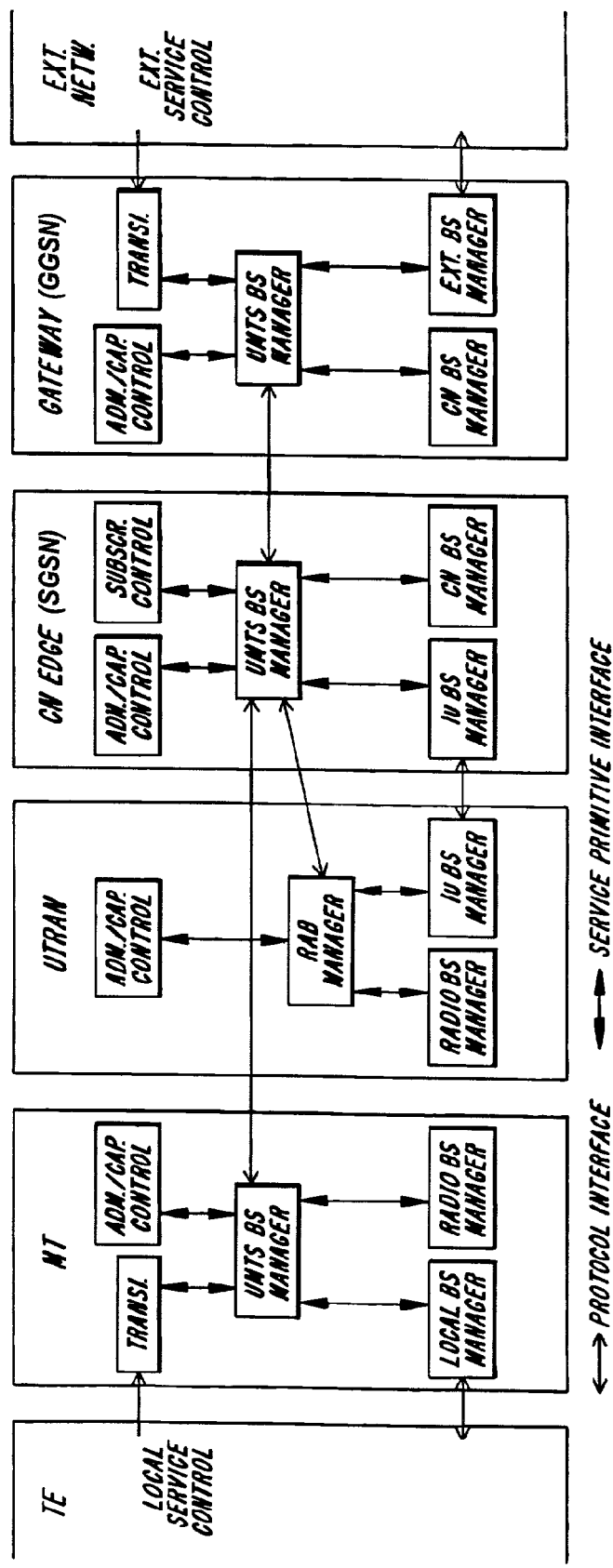
FIG. 5 is a block diagram depicting quality of service management for UMTS bearer services in the control plane.
Figure 6:
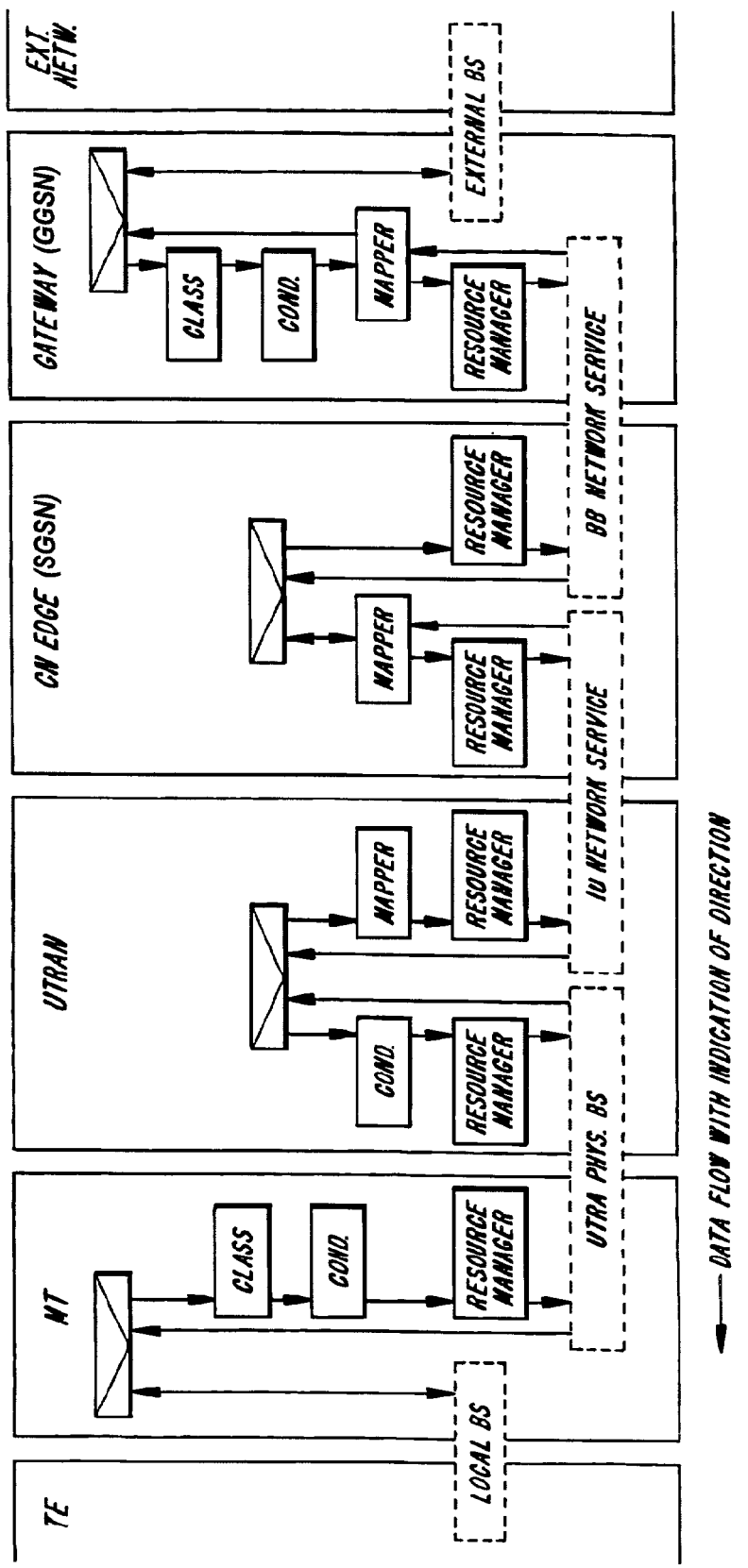
FIG. 6 is a block diagram depicting quality of service management functions for UMTS bearer services in the user plane.
Figure 10:
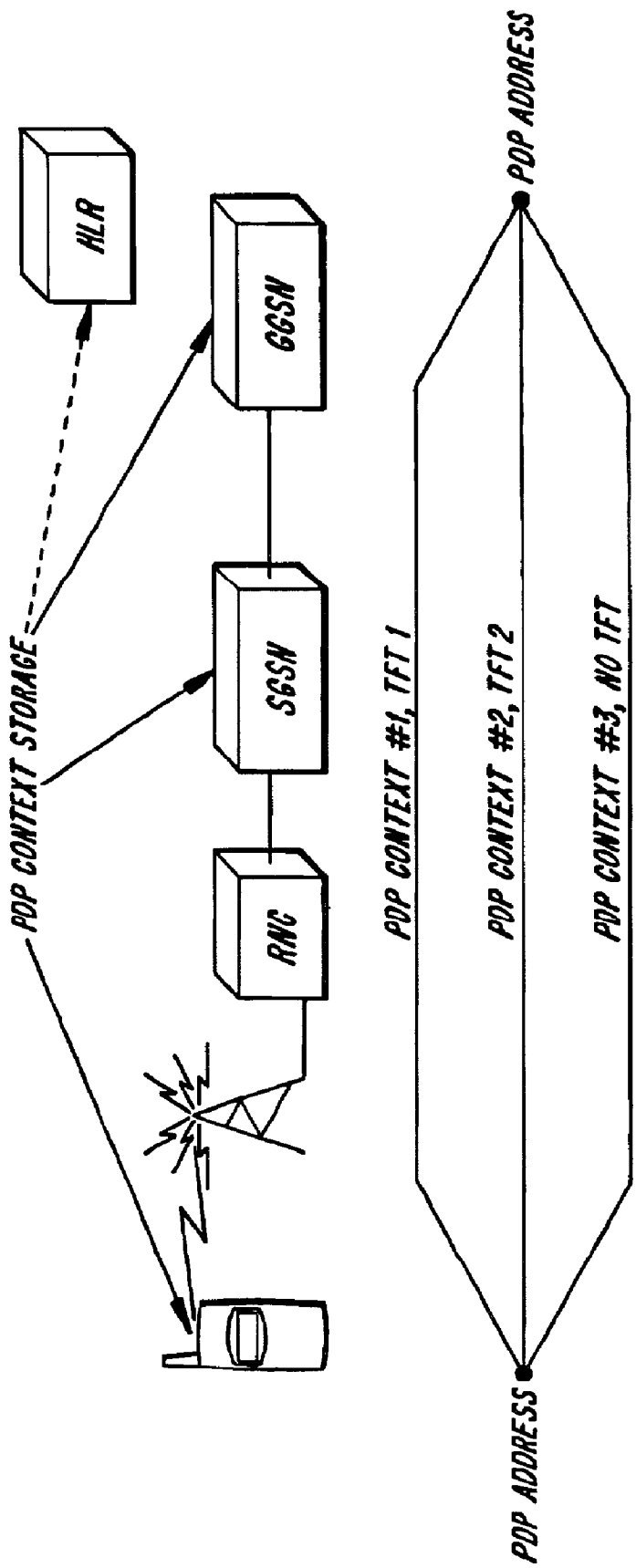
FIG. 10 is a block diagram of the relationship between PDP address, PDP context, and TFT.

The present invention may be employed, for example, in a mobile communications system which supports multimedia sessions, such as that shown in FIG. 2 and described above. When a multimedia session involving the mobile terminal 20 is initiated, either by the mobile terminal 20 or by the remote host 30, a message is sent requesting setup of a bearer between the mobile terminal and an access point in the packet-switched access network 24. That bearer setup message may include a signaling QoS indicator which is detected by nodes in the radio access network (RAN) 22 and in the packet-switched access network (PSAN) 24. For example, such a bearer could be a session signaling bearer between the mobile terminal and a policy control server in the multimedia system 26 through the radio access network 22 and the packet-switched access network 24. In response to detection of the signaling QoS indicator, a signaling bearer is established between the mobile terminal and the multimedia system in accordance with a signaling QoS profile.

In a preferred example embodiment, that signaling quality of service profile has been pre-established to suit the QoS needs particular to a signaling bearer. For example, the pre-established signaling QoS profile includes both low delay and low bit error rate quality of service characteristics. It may also preferably include high priority and bursty traffic pattern quality of service characteristics. Indeed, the high priority characteristic may even permit the bearer's traffic to take priority over traffic on already-established bearers with a different QoS profile.

The signaling quality of service profile may be configured in each node in the radio access network 22 and the packet-switched access network 24 before any session is ever initiated. In other words, because the signaling QoS characteristics are preset, there is no need for signaling QoS characteristics to be negotiated and configured during session setup. Setting of the signaling QoS indicator causes nodes that will support the bearer to retrieve the signaling QoS profile already-configured in those nodes. This QoS retrieval is much quicker and more efficient than the typical bearer quality of service negotiation and configuration procedure normally required for establishing a bearer with a certain QoS.

Figure 11:
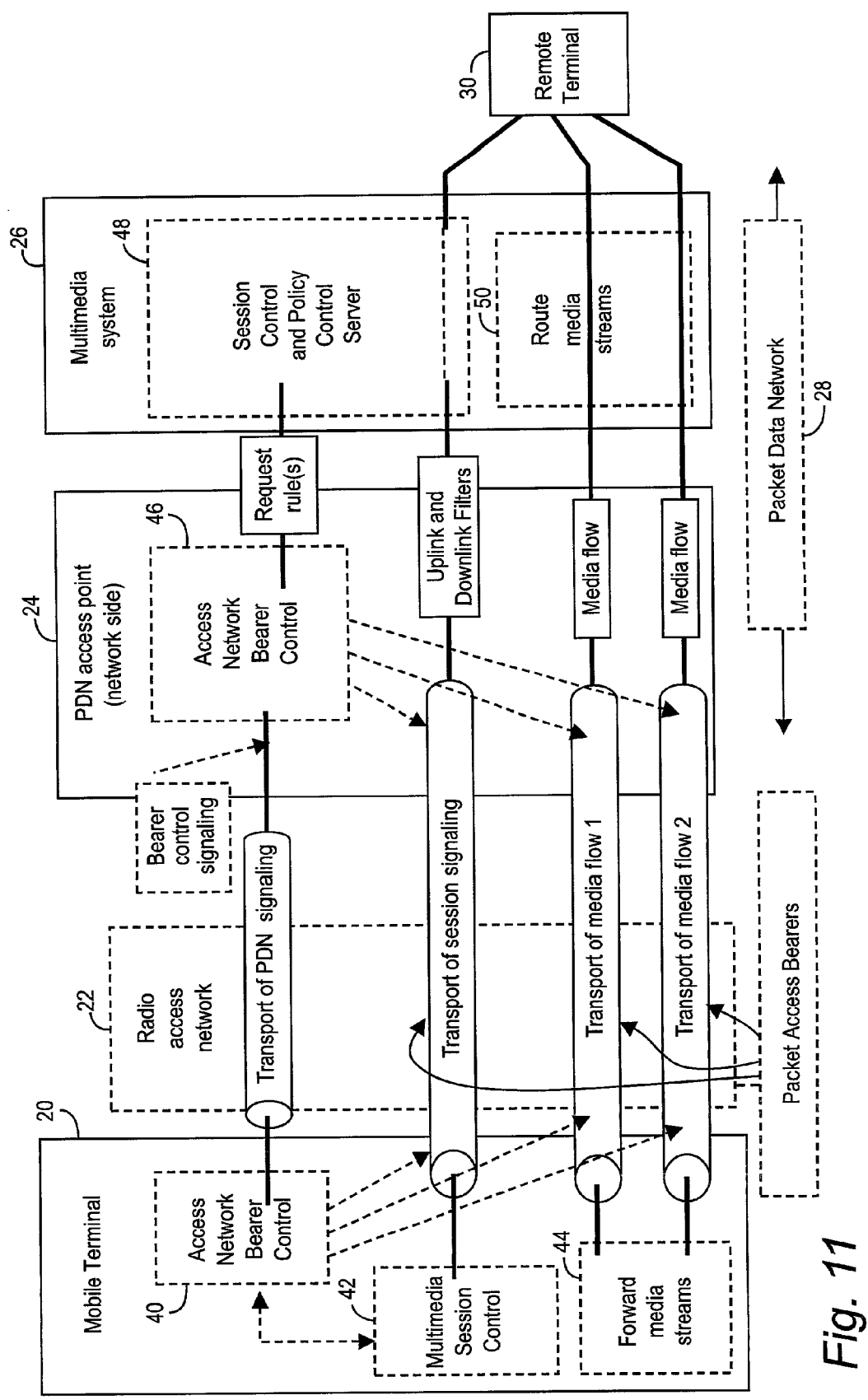
FIG. 11 is a diagram illustrating a multimedia session in the communications system shown in FIG. 2.

FIG. 11 illustrates in further detail elements involved in setting up a multimedia session in accordance with a system such as that shown in FIG. 2. The mobile terminal 20 includes an Access Network Bearer Control block 40 coupled to multimedia session control 42. The Access Network Bearer Control block 40 transports internal bearer control signaling, which is not dedicated to a particular session and is not related to a session signaling bearer, to an Access Network Bearer Control block 46 in the packet data network access point 24 transparently over the radio access network using a PDN signaling transport bearer. Both Access Network Bearer Control blocks 40 and 46 assist in establishing a session signaling bearer for setting up the session. The signaling bearer is shown as the "pipe" entitled "transport of session signaling." Over this session signaling bearer, the mobile terminal 20 initiates a multimedia session with the remote terminal 30. Each media data stream or "flow" in the session is transported over a corresponding media packet access bearer illustrated as a "transport of media flow" pipe coupled to Forward Media Streams 44 in the mobile terminal. Two media flows 1 and 2 are shown for purposes of illustration in this multimedia session. The multimedia system 26 in the packet data network 28 employs a Route Media Streams block 50 to route the packets in each media flow between the mobile terminal 20 and the remote terminal/host 30.

Multimedia system 26 also includes a Session Control and Policy Control block 48 that utilizes the session signaling from the Multimedia Session Control block 42 to correlate each multimedia flow and its corresponding quality of service requirements to establish the necessary admission and policy enforcement rules for the session. Those rules are provided upon request to the Access Network Bearer Control block 46 which performs admission and policy enforcement operations for the session in accordance with the obtained session rules. Part of the supervision and policing of the session signaling bearer is enforced using uplink and downlink packet filters contained in the PDN access point. These uplink and downlink packet filters may be configured from a standardized, minimum set of capabilities, or they may be configured by the operator. These filters can be used to ensure that a bearer with a signaling QoS profile is only used for session signaling purposes and to implement other restrictions or features relating to use of the bearer, examples of which are described later.

Figure 12:
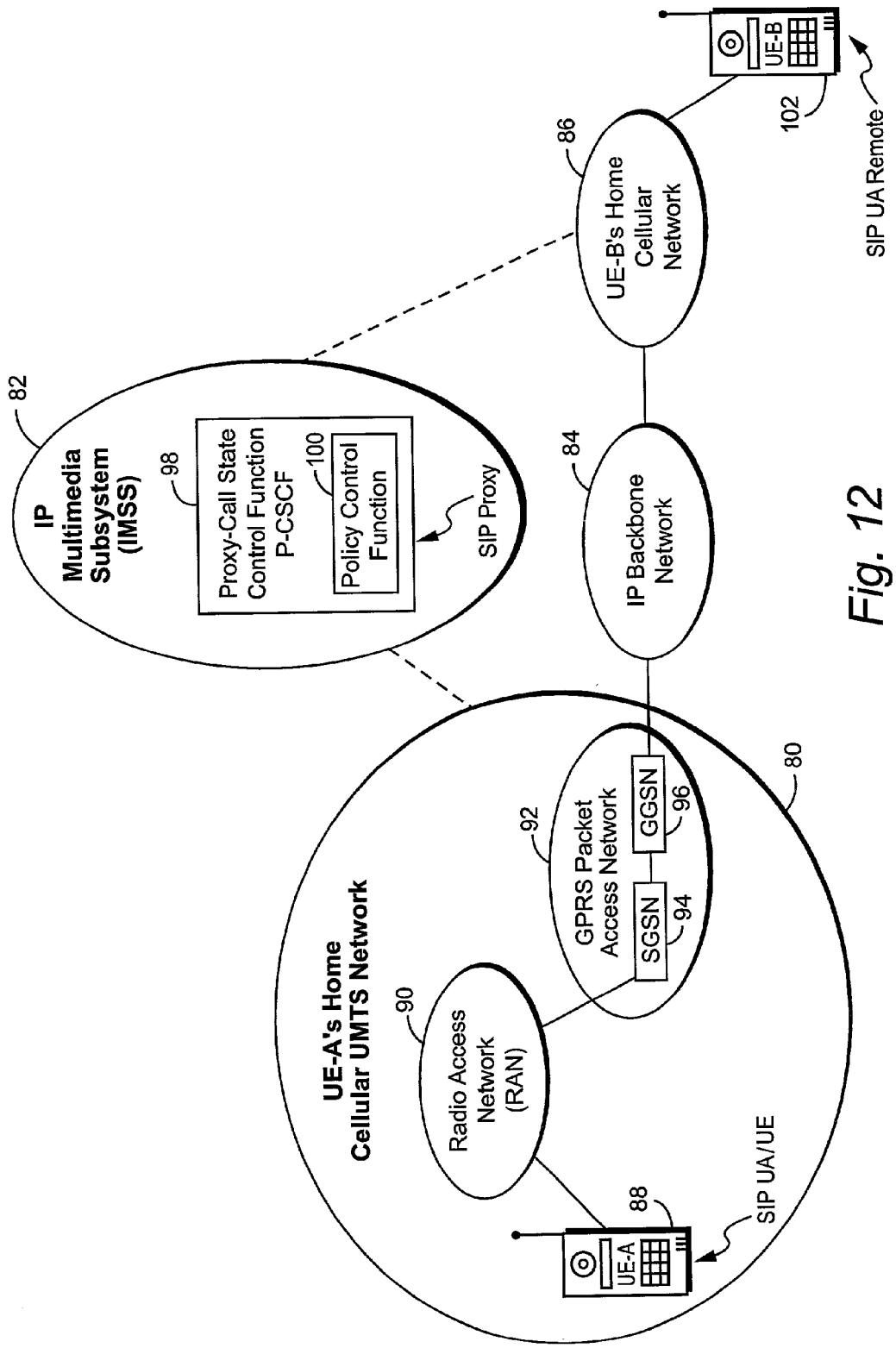
FIG. 12 is a diagram illustrating an example GPRS/UMTS-based communications system for conducting a multimedia session in which the present invention may be employed.

Another non-limiting example communications system in which the present invention may be used is shown in FIG. 12. Here, the session setup is initiated using session initiation protocol (SIP)/session description protocol (SDP). In general, SIP is a signaling protocol that handles the setup, modification, and tear down of multimedia sessions. SIP, in combination with other protocols, describes the session characteristics to potential session participants. Even though SIP messages pass through some of the same physical facilities as the media to be exchanged, SIP signaling is considered separate from the media itself as illustrated in FIG. 12. Although SIP is the preferred signaling protocol, other protocols that can achieve these functions may also be used. SDP provides a format for describing session information to potential session participants. Session-level and media-level parameters are specified using certain SDP fields followed by SDP values.

The mobile terminal UE-A, functioning as a SIP user agent (UA), communicates over a radio interface with a radio access network (RAN) 90 which is coupled to a GPRS packet network 92 in UE-A's local UMTS access network 80. The GPRS packet access network 92 includes one or more serving GPRS support nodes (SGSN) 94 coupled to one or more gateway GPRS support nodes (GGSN) 96. The GGSN 96 performs a number of network edge functions including packet filtering and aggregation functions as well as interworking functions with the IP backbone network 84. The uplink and downlink filters described above to ensure appropriate and authorized use of a session signaling bearer will likely be implemented in the GGSN 96. Mobile terminal UE-B, referred to as the SIP user agent remote in FIG. 12, is coupled to the IP backbone 84 through its own local UMTS access network 86, which may also include its own RAN and GPRS packet access network (not shown).

Each GPRS packet network is coupled to an IP multimedia subsystem (IMSS) 82. Communication with the IMSS 82 (shown as dashed lines) permits exchange of multimedia session control related messages. The session is established and managed using SIP/SDP. The IMSS 82 includes a call state control function (CSCF), in this example, a proxy-CSCF (P-CSCF) 98 is shown and a policy control function (PCF) 100. The P-CSCF 98 and PCF 100 may be implemented on the same or different servers. The P-CSCF 98 functions as a SIP proxy for the SIP user agents. The IMSS 82 is typically part of (although it may be separate from and coupled to) the IP backbone network 34. In the example where the mobile terminal UE-A desires to establish a multimedia session with UE-B, the packet traffic for this session follows the solid line couplings between the various nodes.

Figure 13:
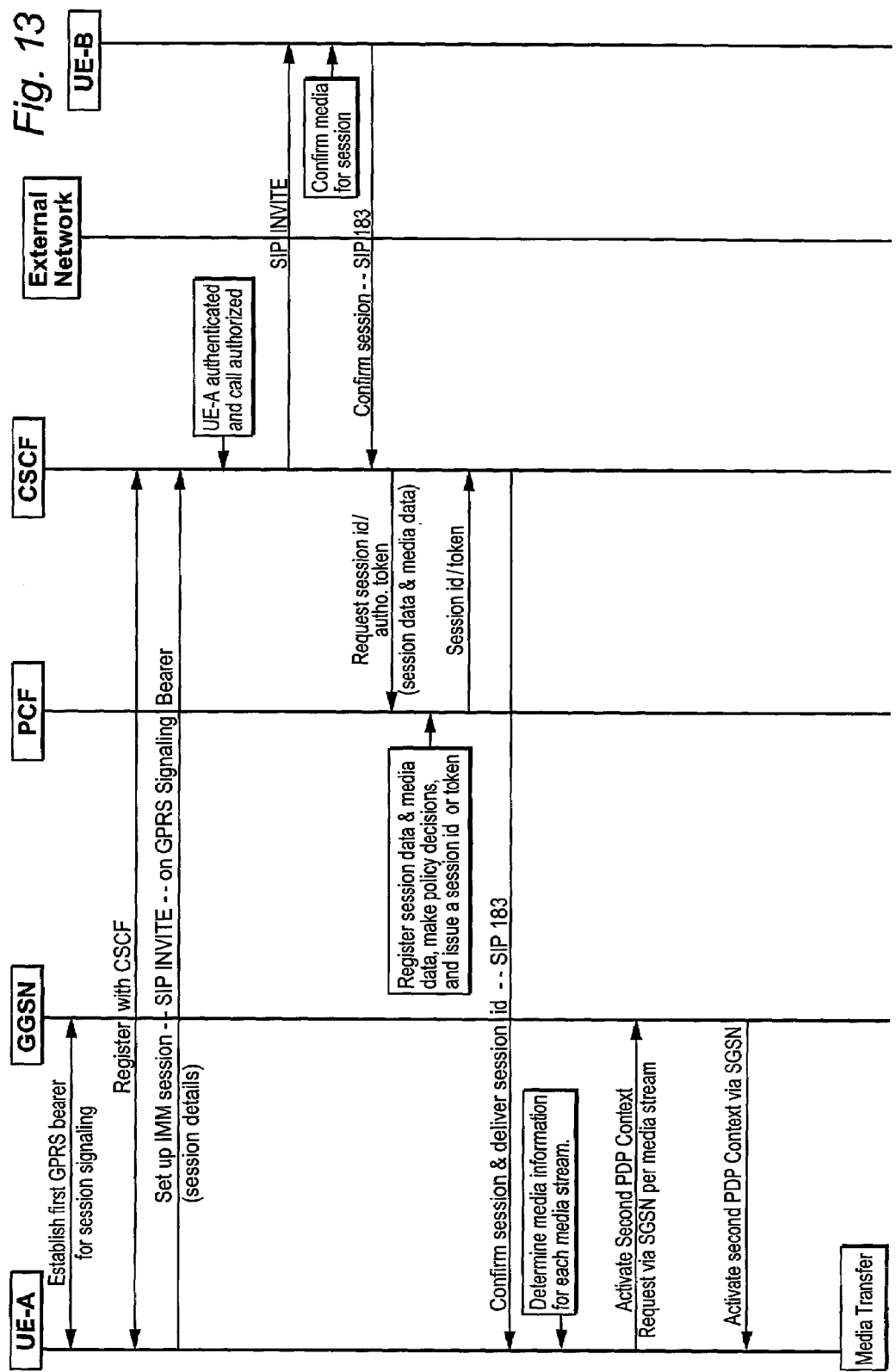
FIG. 13 is a signaling diagram illustrating signaling for setting up a multimedia session in the system of FIG. 12.

An example signaling flow diagram for an example multimedia session between UE-A and UE-B is shown in FIG. 13 and now described. Initially, the UE establishes a first PDP context with the GGSN to establish a GPRS bearer for session signaling, which is needed in order to establish the multimedia session. This signaling bearer is preferably established with a signaling QoS profile for the reasons already-described. The UE-A then registers with the proxy-CSCF before sending a SIP INVITE message on the GPRS signaling bearer to the CSCF to setup the IP multimedia session. The INVITE message includes the session details regarding the number of media flows and requested corresponding quality of service. The CSCF authenticates the UE-A as a subscriber and authorizes the session. The SIP INVITE message is forwarded to UE-B via external networks. UE-B confirms the session request in a SIP "183" message returned to the CSCF. The SIP 183 is an acknowledgment message to the SIP INVITE message. The CSCF requests from the PCF a session identifier (ID) for the session and communicates session-related and media-related data to the PCF. The related data and the media-related data, makes policy decisions for the session, issues the session ID (authorization token), and returns it to the CSCF. The CSCF confirms the session, and delivers the session ID in a SIP 183 message to the UE-A. The UE-A activates a second PDP context, (i.e., by sending a secondary PDP context request message to the SGSN) for each media stream. Media packet access bearers are established for each bidirectional media data stream and media transfer begins.

Figure 14:
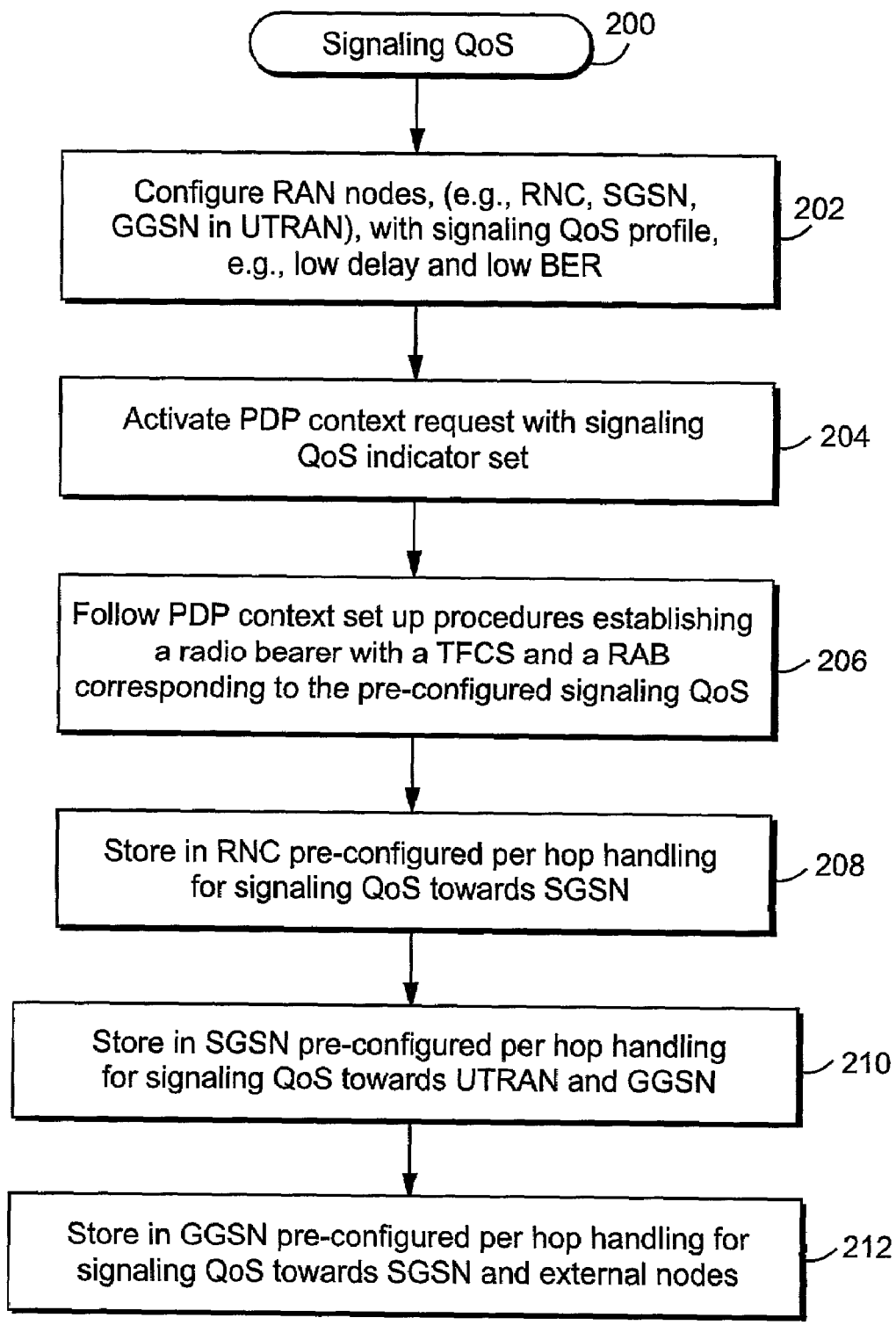
FIG. 14 is a flowchart diagram showing example procedures for setting up a signaling bearer with pre-configured QoS characteristics.

Having just described a multimedia session setup in general, procedures for establishing a bearer through a GPRS/UMTS access network with a signaling QoS profile are now described in conjunction with the signaling QoS routine (block 200) illustrated in flowchart form in FIG. 14. Radio access nodes such as a radio network controller (RNC) and GPRS nodes including the SGSN and GGSN are configured with a quality of service profile for signaling bearers. As described above, such a signaling profile is optimized for signaling bearers in terms of quality of service characteristics, i.e., low delay, low bit error rate, bursty traffic pattern, and/or high priority (block 202). An example of possible signaling QoS characteristics are set forth below. Of course, actual QoS characteristic values will vary depending on network implementation and traffic conditions.

Maximum data unit size=maximum transfer unit (MTU) of the Ethernet
Data unit error ratio=$10^{-5}<x<=5*10^{-4}$
Residual bit error ratio=$6*10^{-8}$ Average bit rate=0.5 kbps up to 4 kbps Token bucket size=2 up to 10*maximum data unit size Priority=If necessary to fulfill requirements for signaling, it is possible for the network to allow packets on a bearer with a signaling QoS profile to take priority over packets on bearers with other QoS profiles.

Delay=Low delay and high priority may be accomplished through network dimensioning and UMTS-internal scheduling. Exact delay figures are implementation dependent. One example delay is about 100 ms—shorter for shorter packets and longer for longer packets. It may be acceptable that ongoing transmission of previous packets to/from a user occasionally increases the delay.

Returning to the flowchart in FIG. 14, when a user wants to setup a session, a first PDP context bearer is established to carry session signaling between the mobile terminal and the GGSN. A PDP context request activate message is sent from the mobile terminal with a signaling bearer quality of service indicator or flag set (block 204). Normal PDP context setup procedures are followed thereafter to establish a radio bearer. However, having detected that a signaling quality of service indicator is set, the radio bearer with a transmission format combination set (TFCS) and a radio access bearer (RAB) are established with the pre-configured signaling quality of service profile (block 206). In addition, a pre-configured per hop handling, (the QoS mechanism employed in DiffServ IP networks), corresponding to the signaling QoS profile is stored in the RNC for signaling QoS towards the SGSN (block 280) and in the SGSN towards the UTRAN and the GGSN (block 210). Similarly, a pre-configured per hop handling corresponding to the signaling quality of service profile is stored in the GGSN for signaling QoS towards the SGSN and external nodes (block 212).

Figure 15:
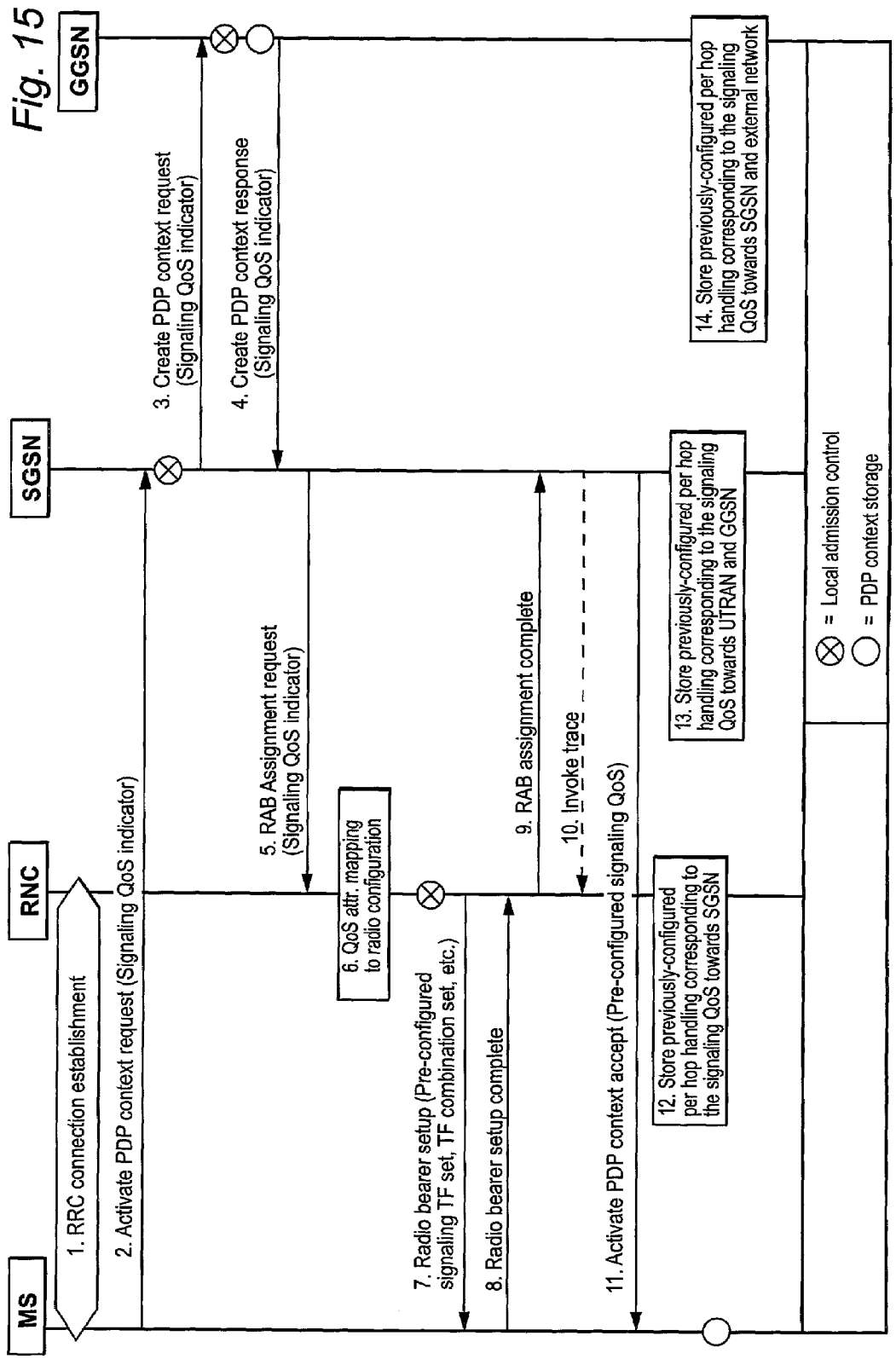
FIG. 15 is a signaling diagram of PDP context message exchanges for setting up a PDP context for a signaling bearer with pre-configured QoS characteristics.

The PDP context signaling typically carries the requested and negotiated QoS profile between the nodes in the UMTS/GPRS access network. It has a central role for QoS handling in terms of admission control, negotiation, and modifying of bearers on a QoS level. As shown in FIG. 13, a signaling bearer is established using a primary (first) PDP context activation procedure. Additional contexts associated to the same PDP address and GGSN are activated with the secondary PDP context activation procedure. A traffic flow template (TFT) is usually associated with each PDP context and is provided to the GGSN to enable packet classification and policing. However, there could be at most one PDP context without a TFT at any time. One of the key functions of a PDP context setup message is to establish a quality of service for the PDP context. An example PDP context signaling message exchange where a signaling QoS indicator in accordance with one aspect of the invention are described below with reference to FIG. 15.

1. A radio resource control (RRC) connection establishment is performed. This procedure is needed for establishing a connection, but does not cover more from a QoS perspective than that the type of radio channel is roughly indicated.

2. The MS sends a PDP message, "Activate PDP context request," to the SGSN. Rather than sending the actual requested QoS profile in this message to the SGSN for an admission check, the PDP message simply includes a signaling QoS indicator or flag which indicates that the predetermined signaling QoS profile is to be used when setting up the bearer.

3. The SGSN sends a "Create PDP Context Request" to the GGSN carrying the signaling QoS indicator or flag which indicates that the signaling QoS profile is to be used when setting up the signaling bearer. The GGSN performs admission control and/or QoS restriction. The GGSN uses the predetermined signaling QoS profile already configured and stored in its database in establishing the bearer.

4. The GGSN returns the signaling QoS indicator to the SGSN in a "Create PDP Context Response" message, and the SGSN responds by using the predetermined signaling QoS profile already configured and stored in its database in establishing the bearer.

5. The SGSN sends an RANAP message, "RAB Assignment Request," to the RNC in the UTRAN with the signaling QoS indicator. RANAP, or Radio Access Network Application Part, is an application protocol for supporting signaling and control transmission between the UTRAN and the external CN. RANAP permits communication between the UTRAN and circuit-switched or packet-switched networks. This request to establish a radio access bearer (RAB) service carries the signaling QoS indicator. The RNC uses the predetermined signaling QoS profile already configured and stored in its database in establishing the bearer.

6. From the signaling QoS indicator, the RNC node in the UTRAN determines the radio-related parameters corresponding to the signaling bearer QoS profile, e.g., a corresponding signaling bearer transport format set (TFS), transport format combination set (TFCS), etc., mapping the signaling QoS attributes to a radio bearer.

7. The RNC sends an RRC message, "Radio Bearer Set-up," to the MS. The RRC message includes the QoS parameters that were determined in step 6.

8. The UTRAN/RNC and the MS apply the QoS parameters and are ready to transfer session signaling messages. To signal this, the MS sends a "Radio Bearer Set-up Complete" RRC message to the RNC.

9. The UTRAN sends a "RAB Assignment Complete" RANAP message to the SGSN.

10. A Trace procedure may be initiated. This is an operation and maintenance function for surveying subscribers.

11. The signaling QoS indicator is sent from the SGSN to the MS in an "Activate PDP Context Accept" message to inform the MS that its request has been granted.

12. The RNC stores the previously-configured per hop handling of this bearer corresponding to the signaling QoS profile towards the SGSN. This operation may occur anytime after step 8.

13. The previously-configured per hop handling corresponding to the signaling QoS profile is stored in the SGSN towards the RNC and the GGSN. This operation may occur anytime after step 9.

14. The previously-configured per hop handling for the signaling QoS profile is stored in the GGSN towards the SGSN and the external network. This operation may occur anytime after step 3.

Although the signaling quality of service indicator may be included in any existing message (or in a new message), in one non-limiting example, a signaling QoS indicator may be included in the QoS information portion of a PDP context setup message, such as is illustrated in FIG. 16. One example location where the signaling QoS indicator may be included is in one of the spare bit fields, e.g., in octet 3. Alternatively, the signaling QoS indicator could be added as part of a new octet, e.g., octet 14 shown in FIG. 16.

One important use of the signaling QoS indicator is to establish the appropriate signaling quality of service profile for an actual signaling bearer for a multimedia session. However, there are other applications in which this indicator may be used. It may also be desirable to permit a user to request and receive a bearer with a signaling QoS profile for a media packet bearer, i.e., a non-signaling, media packet bearer. In the latter case, the PDP context request message for the media packet bearer includes the signaling QoS indicator to signify that a bearer should be set up for this media data stream using the signaling quality of service profile. As described further below, a network operator may charge a fee for using a signaling quality of service profile to transport a media data stream, but not charge when a bearer with the signaling QoS profile is used to transport signaling information for a multimedia session.

When the signaling QoS indicator is set in a PDP context request message for setting up a signaling bearer for a multimedia session, the signaling QoS profile is automatically used. However, if the signaling QoS indicator is not set in the PDP context request message for a signaling bearer, this may be interpreted as permission or an instruction from the mobile terminal that the signaling bearer may be set up with a lower or different quality of service. For example, the mobile terminal may be satisfied with a signaling bearer that has an interactive quality of service profile rather than the signaling quality of service profile. This flexibility allows network operators to conserve network resources if subscribers are willing to accept lower quality of service or signaling bearers in exchange, for example, for reduced rates or other discounts.

Another aspect of the present invention relates to "policing" the signaling quality of service profile. In particular, some network operators may want to ensure that there is no misuse/abuse of bearers which employ the signaling quality of service profile. Consider the situation where the network operator has elected not to charge for signaling bearers in an effort to encourage multimedia sessions. One possible misuse in this situation might be that a mobile terminal requests a bearer with the signaling quality of service profile, but instead of using it as a signaling bearer, the mobile terminal uses it as a media packet bearer free of charge.

Network dimensioning may be employed to restrict use of bearers with a signaling QoS. One example network dimension is to limit the average rate that may be used on a bearer with a signaling QoS profile. The average bit rate may define the maximum number of bits sent over the bearer from a source within a period of time. The traffic may be regarded as conforming with the average bit rate as long as it follows a token bucket algorithm, where the token rate equals the average bit rate, and the bucket size equals k*Maximum service data unit (SDU) size. Regulating the bucket size is another example network dimension that helps regulate data flow because it "smooths out" bursty transmissions.

By controlling the average bit rate and token bucket size to reasonable values, the network can be protected from misuse of the bearer and from denial of service attacks. Denial of service may result if a UE overloads or clogs the network with packets to the point that other legitimate users do not receive the service they request for transporting their packets. This kind of misuse may be prevented by limiting the average bit rate and data flow/bucket size of packets transmitted to/from a UE.

The average bit rate and the bucket size may be configured and enforced in the network and the UE mobile terminals as part of the signaling QoS profile/characteristics. Thus, in the downlink direction, a policing function/filter implemented in the GGSN and/or SGSN ensures that the packet flow over a bearer with the signaling QoS is limited to the configured average bit rate and set bucket size, and the mobile terminal ensures conformance for the uplink traffic. Both provisions protect the GPRS packet access network 92 and the RAN 90 from overload. Such network dimensioning restrictions (e.g., average bit rate and maximum bucket size) associated with a bearer having a signaling QoS profile may be activated using the signaling QoS indicator.

Use of bearers with a signaling QoS profile may also be controlled by one or more packet filters at the access point, (e.g., the GGSN), to filter the packets sent over the bearer. Example and downlink filters are shown in the Packet-Switched access network 24 in FIG. 11. In one example, such filters filter packets so that only signaling packets are transported over such a bearer and traffic packets are blocked from transport. Alternatively, a bearer source and a bearer destination may be identified. Packets transported over the bearer configured with the signaling quality of service profile may be filtered to only permit packets from the identified source that are addressed to the identified destination. For example, the identified source might be the mobile terminal and the identified destination might be a node in the multimedia system 26 like the session control and policy control server 48 (and vice versa). In the IP multimedia subsystem 82 shown in FIG. 12, such a destination node could be the proxy call state control function (P-CSCF) 98.

One example way of indicating that such filters should be activated is to send another indicator or flag, hereafter referred to as a "signaling usage indicator." This signaling usage indicator may be included in the quality of service information in the PDP context setup message shown in FIG. 16. Alternatively, in a preferred example embodiment, it may be sent in a protocol configuration options (PCO) information element/parameter, which is part of the PDP context setup message. An example of a PCO information element is shown in FIG. 17. One of the spare bits is shown as a signaling usage indicator for implementing the one or more signaling QoS bearer restrictions. If this flag is not set, the restriction(s) is (are) not employed. Alternatively, the configuration protocol field in the third octet could include another configuration protocol code which could be used to indicate the restrictive information.

The signaling usage indicator may also be used to instruct a policing mechanism, such as the GGSN, to send feedback or other status information back to the mobile terminal about some aspect of the restriction/policing function. Such feedback information permits the UE to know what kind of restrictions are being placed on the PDP context. It also may inform the UE what packets can be sent on this PDP context and any charging for this PDP context, e.g., if it is free of charge or not. On the other hand, it may be desirable not to routinely require such feedback. In that case, a standard or minimum set of pre-configured bearer capabilities that set forth limits on the use of the bearer may be activated with the signaling usage indicator. Thus, if the nodes in the UMTS/GPRS access network are configured with a standard set of bearer capabilities, setting the signaling usage indicator for a bearer automatically activates filters in network nodes to police use of the bearer in accordance with the standard or minimum set of capabilities. For example, packet filters may limit where the UE can send packets and from which destinations the UE can receive packets over this bearer. However, if a network operator permits, additional destinations or additional capabilities may be allowed beyond the pre-configured minimum set of capabilities. In this case, the GGSN can send feedback to the mobile terminal about such additional destinations/capabilities.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method in an access network coupled to a packet data network, where the access network includes a radio access network coupled to a packet-switched access network which includes an access point coupled to a multimedia system that provides multimedia session services, comprising:
    generating a message requesting a bearer between the mobile terminal and the access point that includes a signaling quality of service (QoS) indicator, and
    detecting the signaling QoS indicator in the message, and in response, establishing a bearer between the mobile terminal and the access point that supports a pre-established signaling QoS profile.

2. The method in claim 1, further comprising:
    initiating a multimedia session involving a mobile terminal and a remote host for a plurality of media data streams using the bearer configured with the signaling QoS profiles.

3. The method in claim 1, wherein the pre-established signaling QoS profile includes both low delay and low bit error rate quality of service characteristics.

4. The method in claim 3, wherein the pre-established signaling QoS profile further includes high priority and bursty traffic pattern quality of service characteristics.

5. The method in claim 4, wherein the high priority quality of service characteristic permits packets sent over the bearer to take priority over packets sent over bearers having a different QoS profile.

6. The method in claim 1, further comprising:
    sending session set up signals over the bearer.

7. The method in claim 1, wherein the pre-established signaling QoS profile is used for all signaling bearers.

8. The method in claim 1, wherein the pre-established signaling QoS profile is used selectively for signaling bearers where the signaling QoS indicator is included in the bearer request message.

9. The method in claim 1, wherein the pre-established signaling QoS profile is used for a media packet access bearer if a message requesting a media packet access bearer between the mobile terminal and the access point includes the signaling QoS indicator.

10. The method in claim 1, wherein the pre-established signaling QoS profile is not permitted for media packet access bearers.

11. The method in claim 1, wherein if the signaling QoS indicator is not included in the bearer request message for a signaling bearer, a signaling bearer may be established in accordance with a quality of service profile other than the pre-established signaling QoS profile.

12. The method in claim 1, wherein the pre-established signaling QoS profile is configured in at least some of the nodes in the access network before the session is initiated.

13. The method in claim 1, wherein the pre-established signaling QoS is not determined or negotiated during set up of the session.

14. The method in claim 1, further comprising:
    restricting use of a bearer with the pre-established signaling QoS profile such that only signaling packets are transported over the bearer and traffic packets are blocked from transport over the bearer.

15. The method in claim 1, wherein the restricting is indicated using a signaling usage indicator provided during bearer establishment and is implemented by packet filtering in the access point node.

16. The method in claim 1, further comprising:
    identifying a bearer source and a bearer destination, and restricting packets transported over the bearer so that packets may only be transported over the bearer from the identified bearer source and to the identified bearer destination.

17. The method in claim 16, wherein the restricting is indicated using a signaling usage indicator and is implemented in the access point node.

18. The method in claim 17, wherein the identified source corresponds to a server in a multimedia system in the downlink direction and the identified destination corresponds to the server in a multimedia system in the uplink direction.

19. The method in claim 1, further comprising: restricting use of a bearer with the pre-established signaling QoS profile by configuring one or both of the mobile terminal and the access point to limit an average data transmission rate over the bearer, wherein if the mobile terminal is so-configured, the mobile terminal limits the average data transmission rate over the bearer for data transmitted from the mobile terminal in an uplink direction and the access point limits the average data transmission rate over the bearer for data transmitted from the access point in a downlink direction,
    wherein the restriction is activated in response to detection of the signaling QoS indicator.

20. The method in claim 19, further comprising:
    restricting use of a bearer with the pre-established signaling QoS profile by configuring one or both of the mobile terminal and the access point to control a flow of data over the bearer, wherein if the mobile terminal and access point are so-configured, the mobile terminal controls the flow of data over the bearer for data transmitted from the mobile terminal in the uplink direction and the access point controls the flow of data over the bearer for data transmitted from the access point in the downlink direction,
    wherein the restriction is activated in response to detection of the signaling QoS indicator.

21. The method according to claim 1, further comprising:
    detecting a signaling usage indicator for the bearer;
    filtering use of the bearer at the access point when the signaling usage indicator is detected; and
    the access point informing the mobile terminal about some aspect of the filtering.

22. The method according to claim 20, further comprising:
    configuring nodes in the access network with a standard set of bearer capabilities associated with use of the bearer;
    detecting a signaling usage indicator for the bearer; and
    when the signaling usage indicator is detected, filtering use of the bearer at the access point in accordance with the standard set of bearer capabilities.

23. The method in claim 22, further comprising:
    when the signaling usage indicator is detected, filtering use of the bearer at the access point in accordance with at least one bearer capability in addition to the standard set of bearer capabilities, and the access point informing the mobile terminal about some aspect of the policing in accordance with the at least one additional restriction.

24. A method for use in a universal mobile telecommunications system (UMTS)/general packet radio services (GPRS) network, including a radio network controller (RNC), a serving GPRS support node (SGSN), and a gateway GPRS serving node (GGSN), comprising:
generating a PDP context request message requesting a bearer between the mobile terminal and the GGSN, where the PDP context request message includes a signaling quality of service (QoS) indicator, and
detecting the signaling QoS indicator in the PDP context request message, and in response, establishing a bearer between the mobile terminal and the GGSN in accordance with a pre-established signaling QoS profile.

25. The method in claim 24, further comprising:
initiating a multimedia session involving mobile terminal and a remote host for a plurality of media data streams using the bearer with the signaling QoS profile.

26. The method in claim 24, wherein the pre-established signaling QoS profile includes both low delay and low bit error rate quality of service characteristics.

27. The method in claim 26, wherein the pre-established signaling QoS profile further includes high priority and bursty traffic pattern quality of service characteristics.

28. The method in claim 26, wherein the high priority quality of service characteristic permits packets sent over the bearer to take priority over packets sent over bearers having a different QoS profile.

29. The method in claim 24, further comprising:
sending session set up signals over the bearer.

30. The method in claim 24, wherein the detecting step includes the SGSN and the GGSN detecting the signaling QoS indicator in the PDP context request message, and thereafter, the SGSN sends a radio access bearer request to a radio network controller (RNC) in the UTRAN for a radio access bearer (RAB) configured to support the signaling QoS profile.

31. The method in claim 30, wherein the RNC sends a radio bearer setup request to the mobile terminal requesting a transport format associated with the signaling QoS profile.

32. The method in claim 30, wherein the RNC and the SGSN store a previously-configured per hop handling associated with the signaling QoS profile for the established bearer.

33. The method in claim 30, wherein the GGSN stores a previously-configured per hop handling associated with the signaling QoS profile for the established bearer.

34. The method in claim 24, wherein the pre-established signaling QoS profile is used for all signaling bearers.

35. The method in claim 24, wherein the pre-established signaling QoS profile is used selectively for signaling bearers where the signaling QoS indicator is included in the PDP context request message.

36. The method in claim 24, wherein the pre-established signaling QoS profile is used for a media packet access bearer if a PDP context request message requesting a media packet access bearer between the mobile terminal and the GGSN includes the signaling QoS indicator.

37. The method in claim 24, wherein the pre-established signaling QoS profile is not permitted for media packet access bearers.

38. The method in claim 24, wherein if the signal QoS indicator is not included in the PDP context request message for a signaling bearer, the signaling bearer may be established in accordance with a quality of service profile other than the pre-established signaling QoS profile.

39. The method in claim 24, wherein the pre-established signaling QoS profile is configured in the RNC, the SGSN, and the GGSN before the session is initiated.

40. The method in claim 24, wherein the pre-established signaling QoS is not determined or negotiated during set up of the session.

41. The method in claim 24, further comprising:
restricting use of a bearer with the pre-established signaling QoS profile such that only signaling packets are transported over the bearer and traffic packets are blocked from transport over the bearer.

42. The method in claim 41, wherein the restricting is indicated using a signaling usage indicator in a protocol configuration options (PCO) parameter associated with the PDP context request and is implemented by packet filtering in the GGSN.

43. The method in claim 24, further comprising:
identifying a bearer source and a bearer destination, and
restricting packets transported over the bearer so that packets may only be transported over the bearer from the identified bearer source and to the identified bearer destination.

44. The method in claim 43, wherein the restricting is implemented in the GGSN when the GGSN detects a signaling usage indicator in the PDP request message,
wherein the identified source corresponds a server in a multimedia system coupled to the GGSN in the downlink direction, and
wherein the identified destination corresponds to the server in the multimedia system in the uplink direction.

45. The method in claim 24, further comprising:
restricting use of a bearer with the pre-established signaling QoS profile by configuring one or both of the mobile terminal and the GGSN to limit an average data transmission rate over the bearer,
wherein if the mobile terminal is so-configured, the mobile terminal limits the average data transmission rate over the bearer for data transmitted from the mobile terminal in the uplink direction,
wherein if the GGSN is so-configured, the GGSN limits the average data transmission rate over the bearer for data transmitted from the access point in the downlink direction, and
wherein the restriction is activated using the signaling QoS indicator.

46. The method in claim 24, further comprising:
restricting use of a bearer with the pre-established signaling QoS profile by configuring one or both of the mobile terminal and the GGSN to control a flow of data over the bearer,
wherein if the mobile terminal is so-configured, the mobile terminal controls the flow of data over the bearer for data transmitted from the mobile terminal in the uplink direction,
wherein if the GGSN is so-configured, in response to detection of GGSN controls the flow of data over the bearer for data transmitted from the access point in the downlink direction, and
wherein the restriction is activated in response to detection of the signaling QoS indicator.

47. The method according to claim 24, further comprising:
detecting a signaling usage indicator for the bearer;
when the signaling usage indicator is detected, filtering use of the bearer at the GGSN; and the GGSN informing the mobile terminal about some aspect of the filtering.

48. The method according to claim 24, further comprising:
configuring the GGSN with a standard set of bearer capabilities associated with use of the bearer;
detecting a signaling usage indicator for the bearer; and
when the signaling usage indicator is detected, filtering use of the bearer at the GGSN in accordance with the standard set of bearer capabilities.

49. The method in claim 48, further comprising:
when the signaling usage indicator is detected, filtering use of the bearer at the GGSN in accordance with at least one bearer capability in addition to the standard set of bearer capabilities, and
the GGSN informing the mobile terminal about some aspect of the filtering in accordance with the at least one additional capability.

50. A communications system for providing communication between a mobile terminal and a remote host configured for communication with a packet data network (PDN), comprising:
a radio access network (RAN) node for communicating with the mobile terminal over a radio interface;
a multimedia system node for providing multimedia session services;
a packet-switched access network (PSAN) node coupled to the RAN node, the PDN, and the multimedia system node,
wherein one or more of the nodes is configured to detect a signaling quality of service (QoS) indicator in a bearer request message and to assist in establishing a bearer between the mobile terminal and the PSAN node that supports a pre-established signaling QoS profile.

51. The communications system in claim 50, wherein the pre-established signaling QoS includes both low delay and low bit error rate quality of service characteristics.

52. The communications system in claim 51, wherein the pre-established signaling QoS profile further includes high priority and bursty traffic pattern quality of service characteristics.

53. The communications system in claim 52, wherein the high priority quality of service characteristic permits packets sent over the bearer to take priority over packets sent over bearers with a different QoS profile.

54. The communications system in claim 50, wherein the pre-established signaling QoS profile is used for all signaling bearers.

55. The communications system in claim 50, wherein the pre-established signaling QoS profile is used selectively for signaling bearers where the signaling QoS indicator is included in the bearer request message.

56. The communications system in claim 50, wherein the RAN node is a radio network controller (RNC) the PSAN node is a gateway GPRS serving node (GGSN).

57. The communications system in claim 56, wherein the pre-established signaling QoS profile is used for a media packet access bearer if the bearer request message requesting a media packet access bearer between the mobile terminal and the GGSN includes the signaling QoS indicator.

58. The communications system in claim 50, wherein the pre-established signaling QoS profile is not permitted for media packet access bearers.

59. The communications system in claim 50, wherein the pre-established signaling QoS profile is configured in each node before the session is initiated.

60. The communications system in claim 50, wherein the pre-established signaling QoS is not determined or negotiated during set up of the session.

61. The communications system in claim 50, wherein the PSAN node includes one or more filters to restrict use of a bearer with the pre-established signaling bearer QoS profile so that only signaling packets are transported over the bearer and traffic packets are blocked from transport over the bearer by the one or more filters.

62. The communications system in claim 61, wherein the restriction is indicated using a signaling usage indicator associated with the bearer request.

63. The communications system in claim 50, wherein a bearer source and a bearer destination are identified in the PSAN node, and the PSAN node is configured to detect a signaling usage indicator in the bearer request, and in response, to restrict packets transported over the bearer so that packets may only be transported over the bearer from the identified bearer source and to the identified bearer destination.

64. The communications system in claim 63, wherein the identified source corresponds to the multimedia system node in the downlink direction and the identified destination corresponds the multimedia system node in the uplink direction.

65. The communications system in claim 64, wherein the bearer is restricted to a signaling bearer which is only permitted to transport signaling information.

66. The communications system according to claim 50, wherein the PSAN node is further configured to:
detect a signaling usage indicator for the bearer;
filtering use of the bearer at the PSAN node when the signaling usage indicator is detected; and
inform the mobile terminal about some aspect of the filtering.

67. The communications system according to claim 50, wherein the PSAN node is further configured to:
configure the GGSN with a standard set of bearer capabilities;
detect a signaling usage indicator for the bearer;
filter use of the bearer at the PSAN node in accordance with the standard set of bearer capabilities when the signaling usage indicator is detected.

68. The communications system in claim 67, wherein the PSAN node is configured to filter use of the bearer in accordance with at least one bearer capability in addition to the standard set of bearer capabilities and to inform the mobile terminal about some aspect of the filtering in accordance with the at least one additional bearer capability when the signaling usage indicator is detected.

69. For use in a universal mobile telecommunications system (UMTS)/general packet radio services (GPRS) network that includes a radio network controller (RNC), a serving GPRS support node (SGSN), and a gateway GPRS serving node (GGSN), the GGSN comprising:
means for storing a pre-established signaling QoS profile;
means for receiving a PDP context request message requesting a bearer between the mobile terminal and the GGSN;
means for detecting whether the PDP context request message includes a signaling quality of service (QoS) indicator; and
means for assisting in establishing a bearer between the mobile terminal and the GGSN in accordance with the pre-established signaling QoS profile.

70. The GGSN in claim 69, further comprising:
means for restricting use of the bearer with the signaling QoS such that only signaling packets are transported over the bearer and traffic packets are blocked from transport over the bearer.

71. The GGSN in claim 69, wherein means for detecting detects whether signaling usage indicator is included in a protocol configuration options (PCO) parameter associated with the PDP context request, the GGSN further comprising a means for restricting packets over the bearer in accordance with the signaling usage indicator.

72. The GGSN in claim 71, further comprising:
means for identifying a bearer source and a bearer destination,
wherein the means for restricting restricts packets transported over the bearer so that packets may only be transported over the bearer from the identified bearer source and to the identified bearer destination.

73. The GGSN in claim 69, further comprising:
means for restricting use of the bearer in response to with the signaling QoS indicator to an average data transmission rate over the bearer.

74. The method in claim 69, further comprising:
means for restricting use of the bearer in response to the signaling QoS indicator to control a flow of data over the bearer.

75. The GGSN according to claim 69, further comprising:
means for detecting a signaling usage indicator for the bearer;
means filtering use of the bearer; and
means for informing the mobile terminal about some aspect of the filtering.

76. The GGSN according to claim 69, wherein the means for storing stores a standard set of bearer capabilities associated with use of the bearer, further comprising:
means for detecting a signaling usage indicator for the bearer, and
means for filtering use of the bearer at the GGSN in accordance with the standard set of bearer capabilities.

77. The GGSN in claim 76, wherein the means for filtering filters use of the bearer at the GGSN in accordance with at least one bearer capability in addition to the standard set of bearer capabilities, further comprising:
means for informing the mobile terminal about some aspect of the filtering in accordance with the at least one additional capability.

* * * * *